F. SKERL.
TICKET ISSUING MECHANISM.
APPLICATION FILED NOV. 5, 1920.

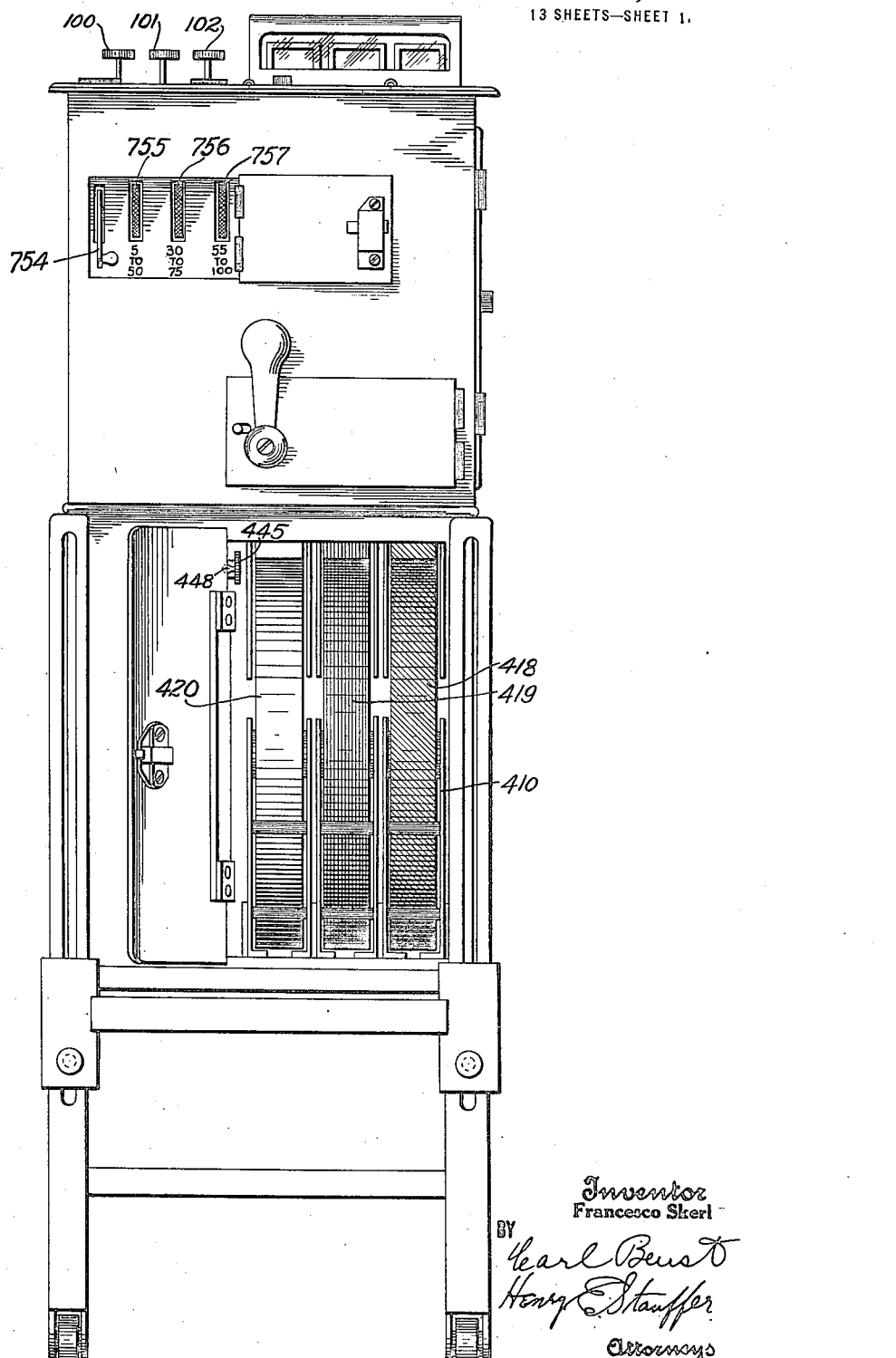

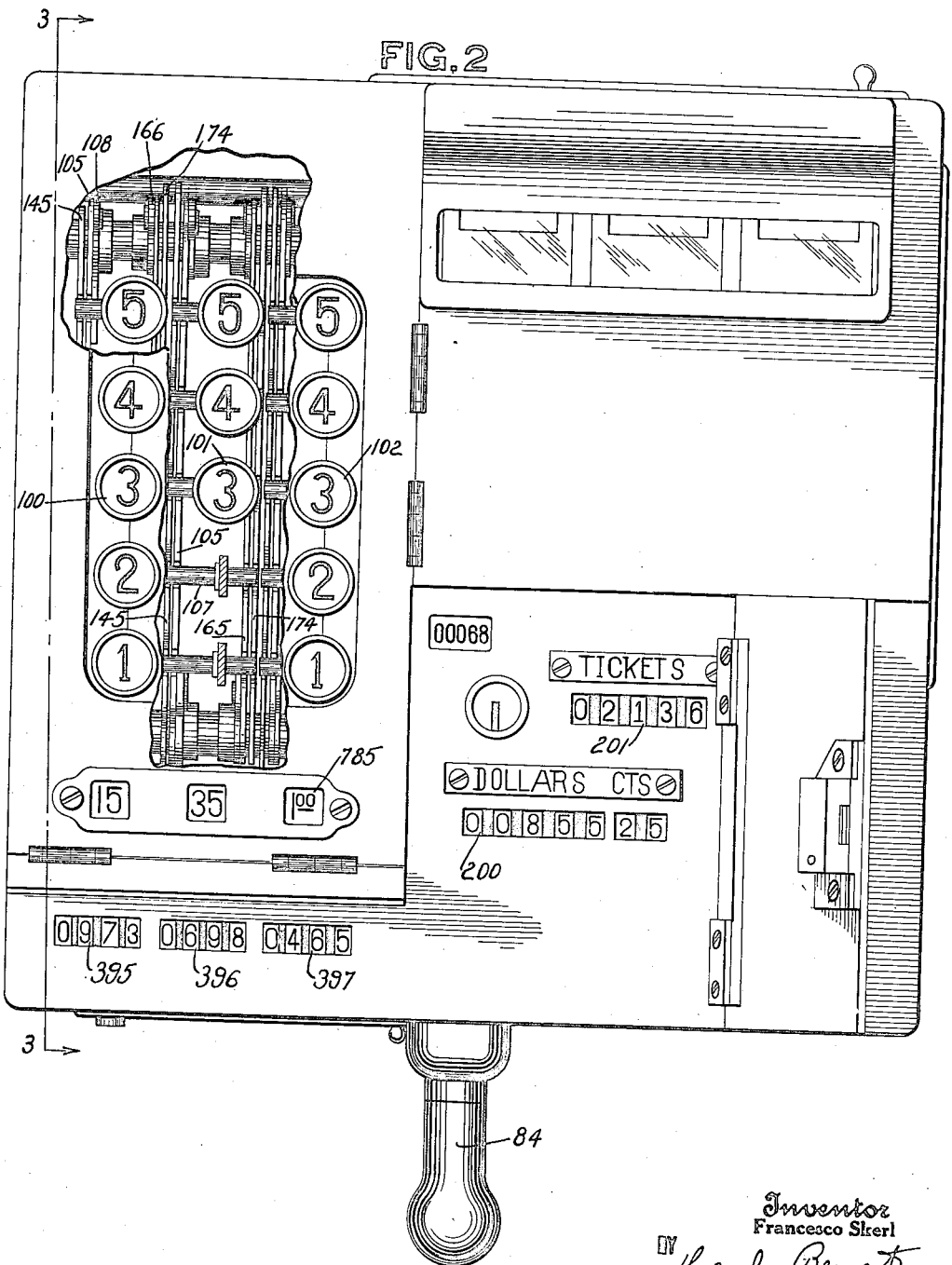

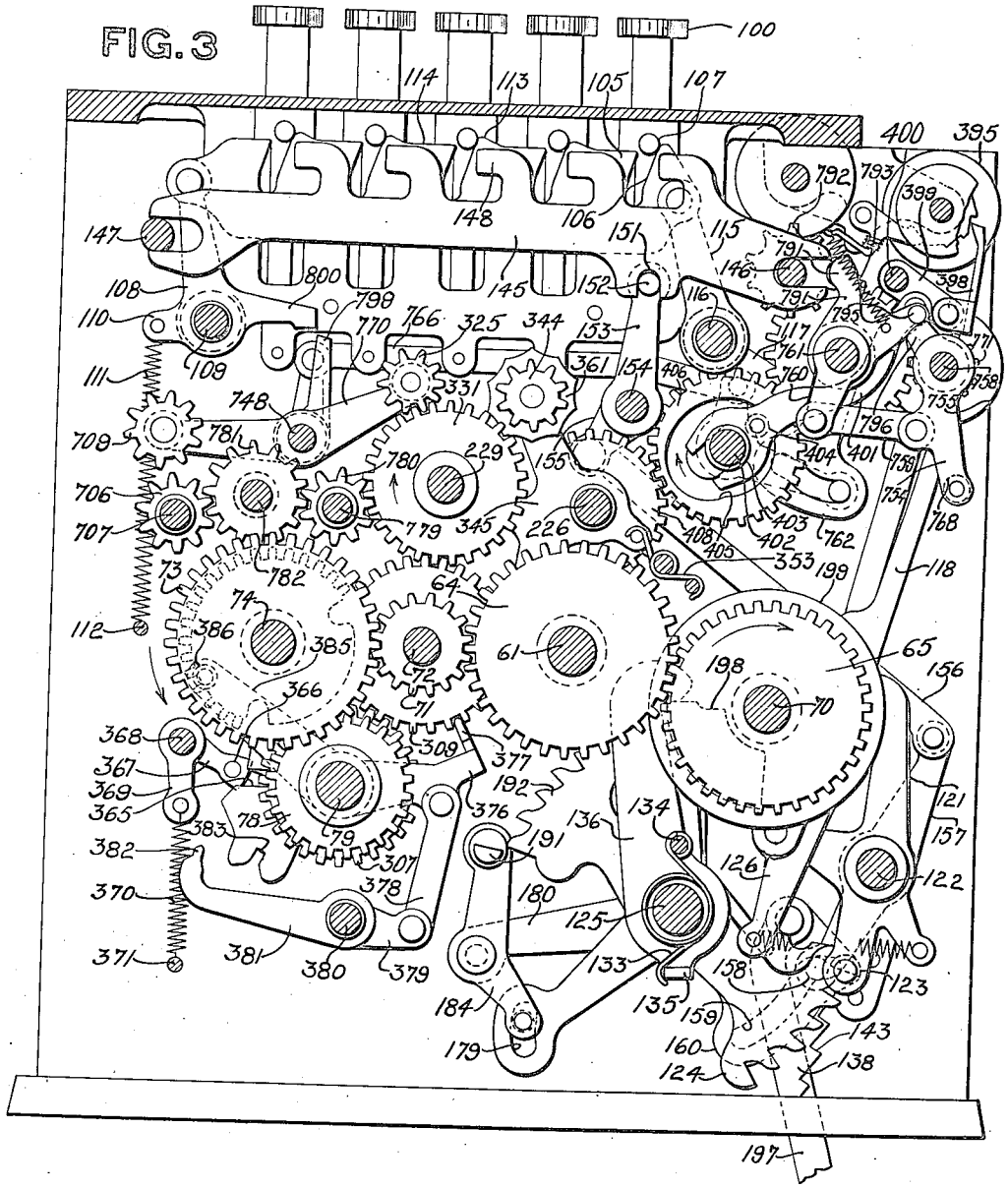

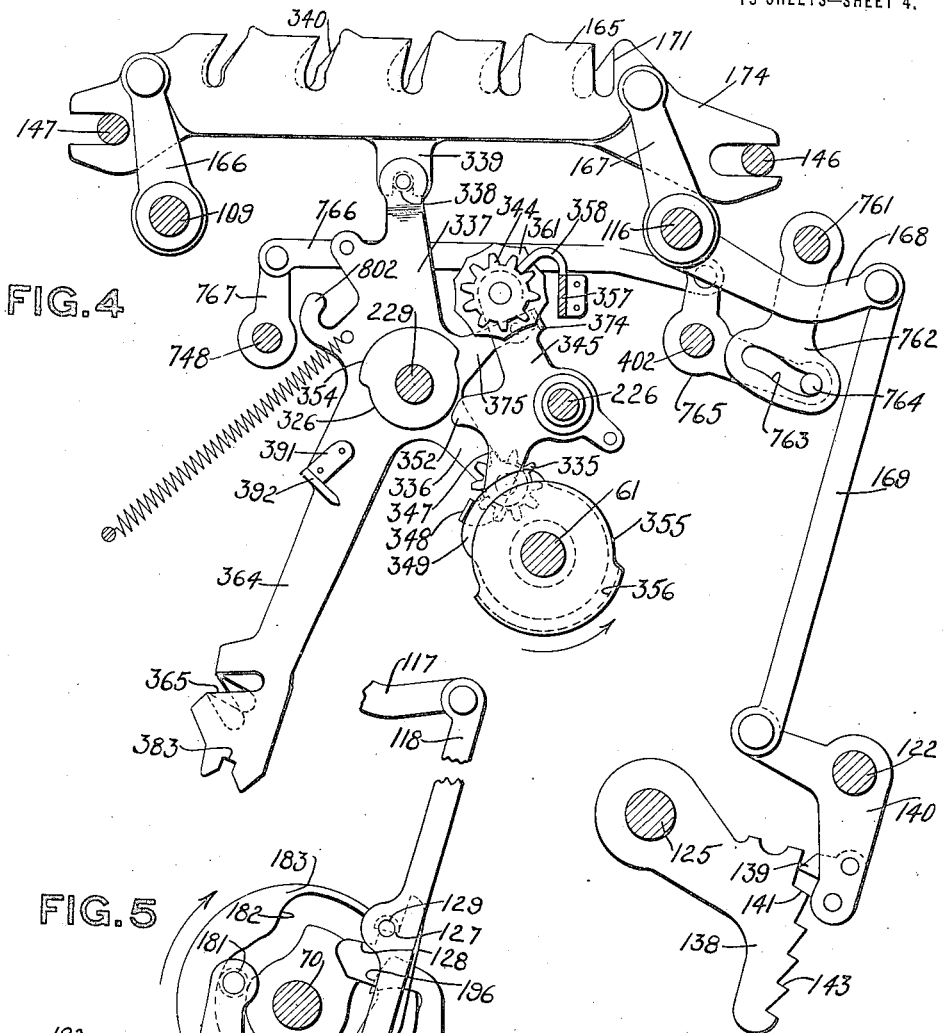
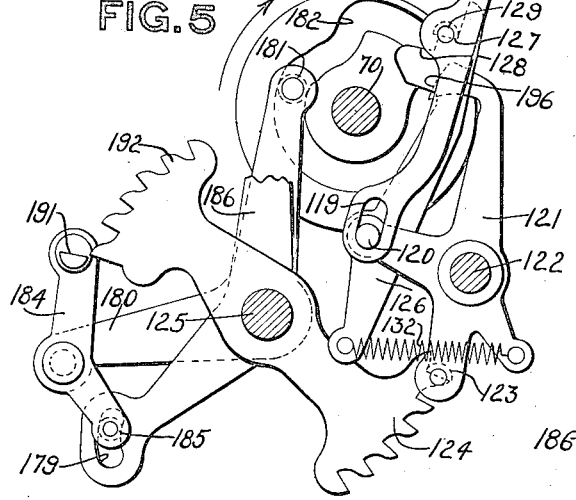
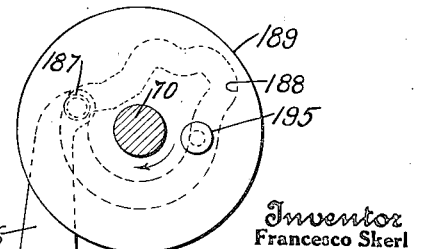

1,435,185.

Patented Nov. 14, 1922.
13 SHEETS—SHEET 5.

Inventor
Francesco Skerl
BY
Carl Beust
Henry C. Stauffer
Attorneys

F. SKERL.
TICKET ISSUING MECHANISM.
APPLICATION FILED NOV. 5, 1920.
1,435,185.
Patented Nov. 14, 1922.
13 SHEETS—SHEET 6.
FIG. 9
FIG. 10
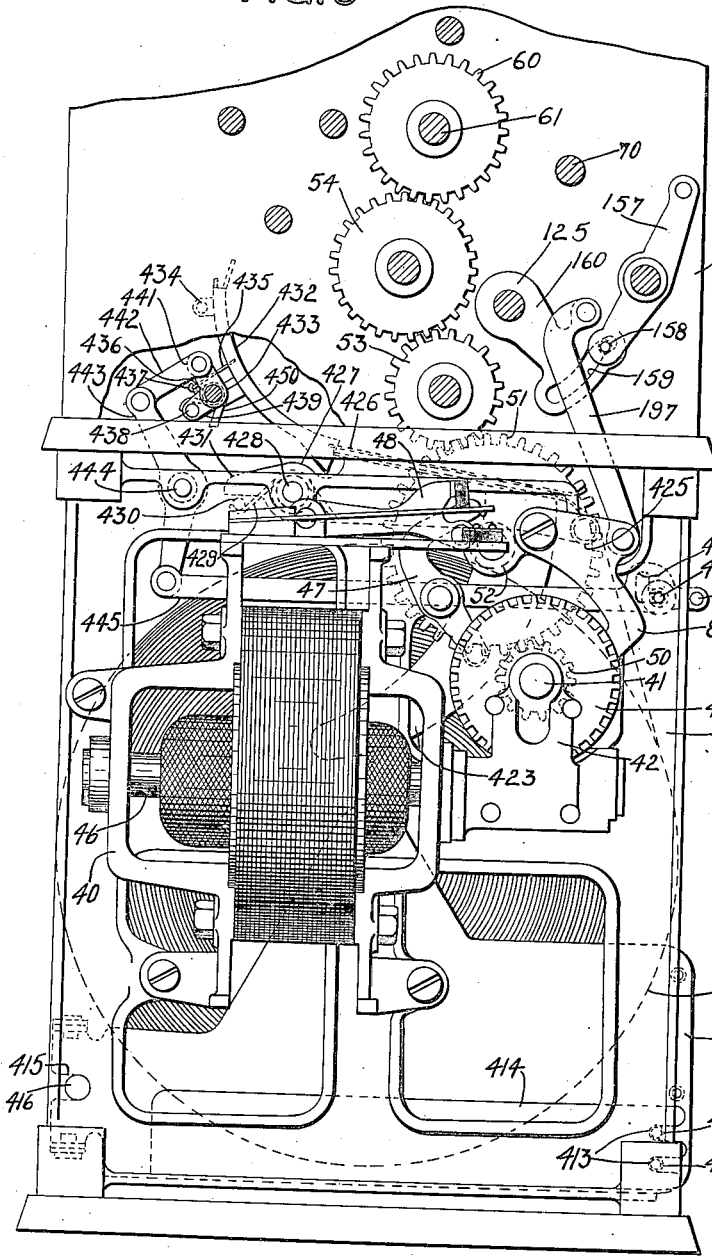
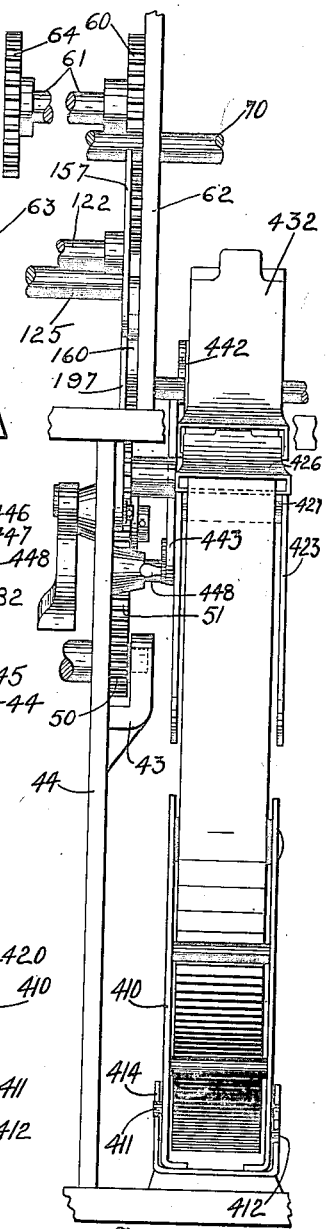
Inventor
Francesco Skerl

F. SKERL.
TICKET ISSUING MECHANISM.
APPLICATION FILED NOV. 5, 1920.

1,435,185.

Patented Nov. 14, 1922.
13 SHEETS—SHEET 9.

Inventor
Francesco Skerl
By Carl Beust
Henry E. Stauffer
Attorneys

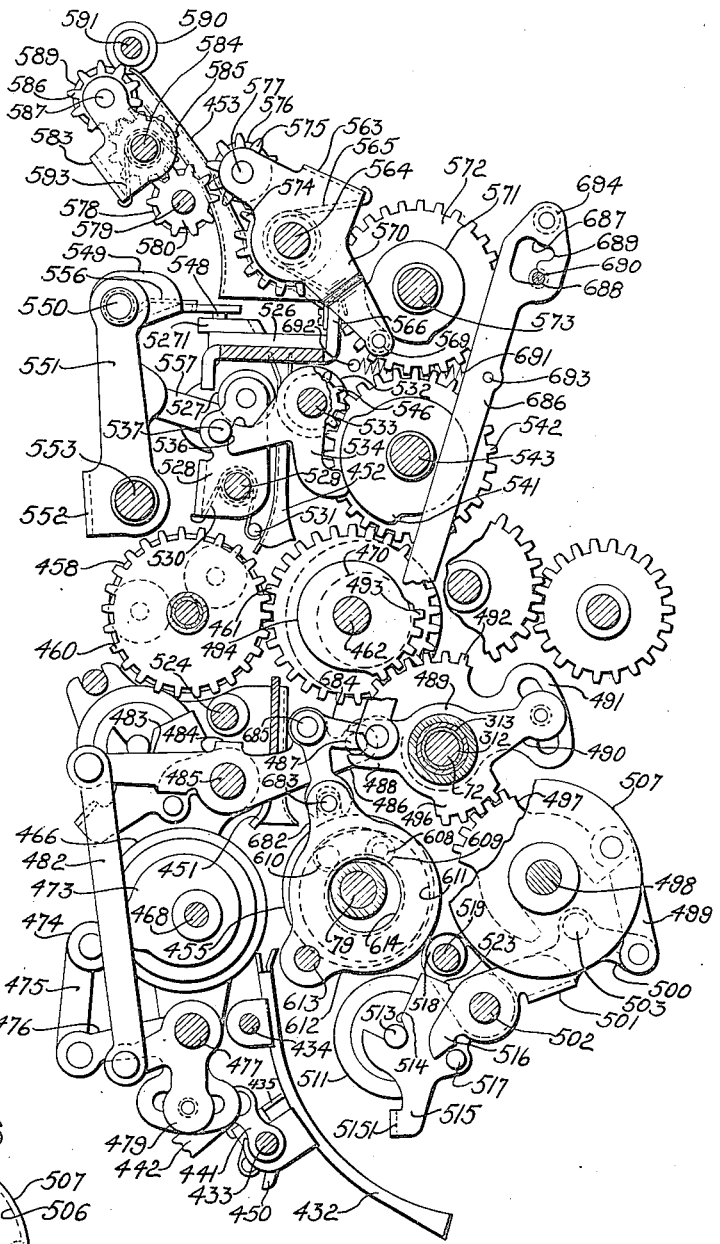

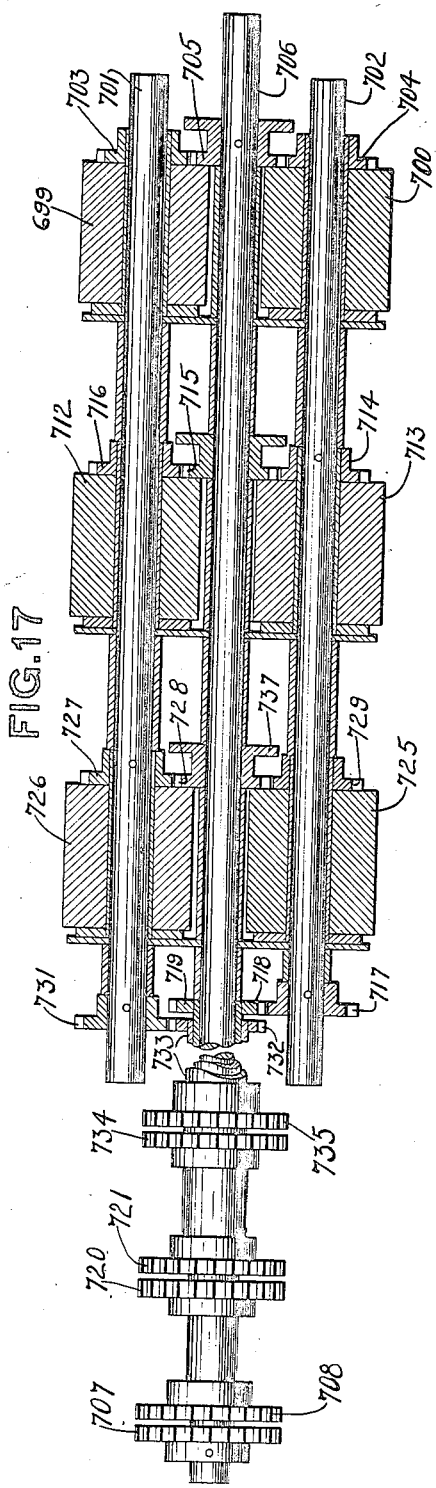
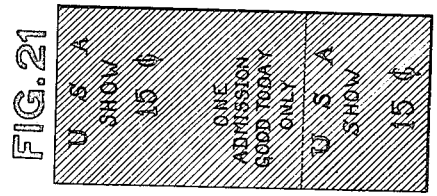
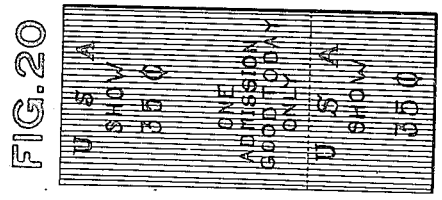
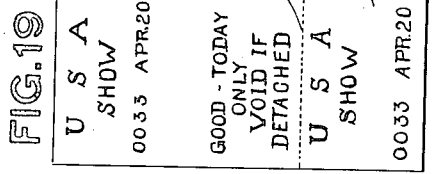
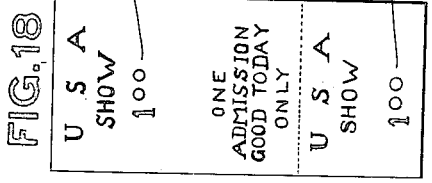

F. SKERL.
TICKET ISSUING MECHANISM.
APPLICATION FILED NOV. 5, 1920.
1,435,185.
Patented Nov. 14, 1922.
13 SHEETS—SHEET 12.
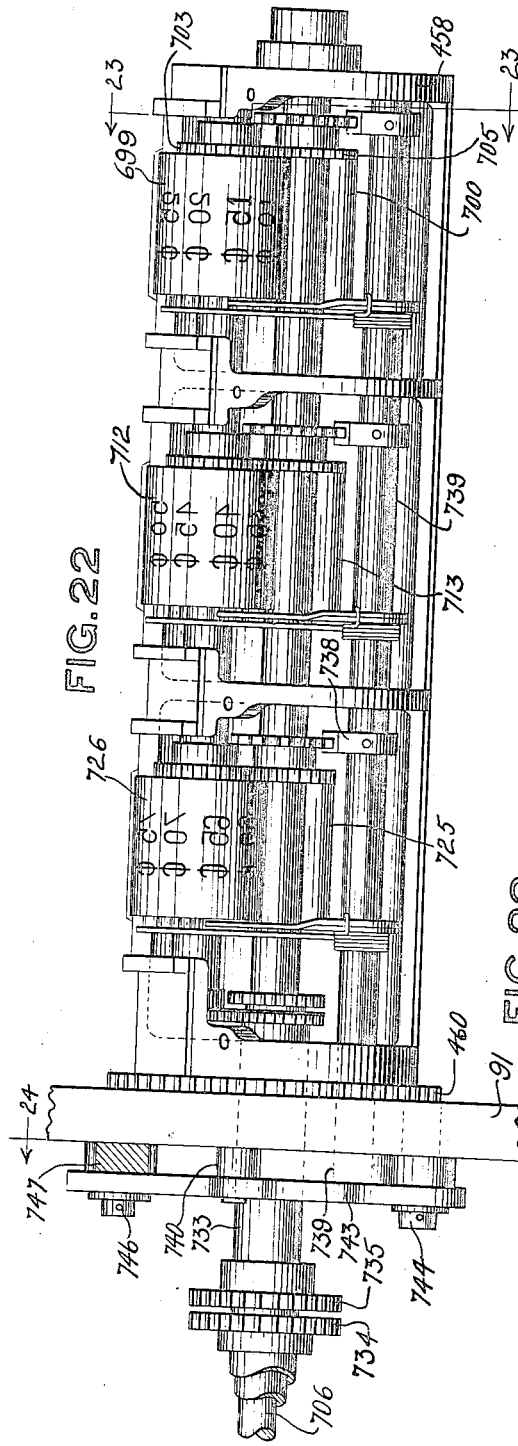
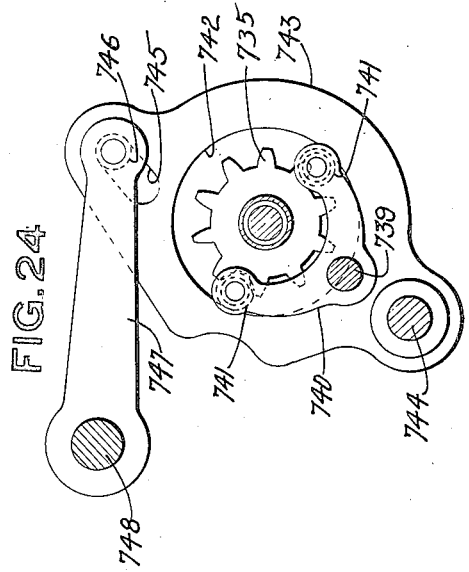
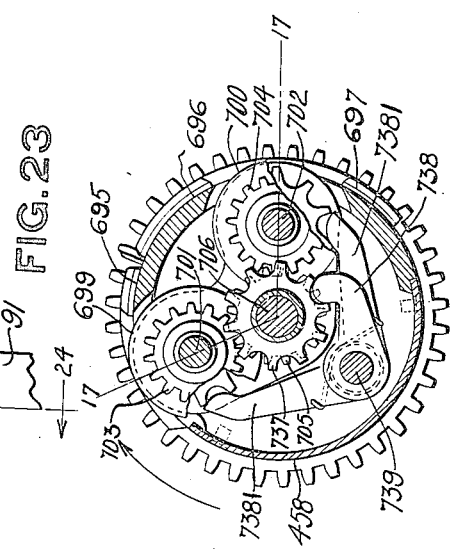
Inventor
Francesco Skerl
BY
Carl Beust
Henry E. Stauffer
Attorneys

F. SKERL.
TICKET ISSUING MECHANISM.
APPLICATION FILED NOV. 5, 1920.

1,435,185.

Patented Nov. 14, 1922.
13 SHEETS—SHEET 13.

FIG. 25
FIG. 26
FIG. 27
FIG. 28

Inventor
Francesco Skerl
BY Carl Beust
Henry E. Stauffer
Attorneys

Patented Nov. 14, 1922.

1,435,185

UNITED STATES PATENT OFFICE.

FRANCESCO SKERL, OF NEW YORK, N. Y., ASSIGNOR TO THE NATIONAL CASH REGISTER COMPANY, OF DAYTON, OHIO.

TICKET-ISSUING MECHANISM.

Application filed November 5, 1920. Serial No. 422,053.

*To all whom it may concern:*

Be it known that I, FRANCESCO SKERL, a citizen of the United States, residing at New York, in the county of New York and State of New York, have invented certain new and useful Improvements in Ticket-Issuing Mechanism, of which I declare the following to be a full, clear, and exact description.

This invention relates to ticket issuing machines and has particular reference to improvements in machines of the kind which are adapted to issue a varying number of tickets from any one of a plurality of ticket strips.

The subject matter of the present application constitutes a division of an application of Francesco Skerl, Serial No. 97,584, filed May 15, 1916, now Patent No. 1,382,685 granted June 28, 1921.

Certain of the constructions shown in the present application are not described in detail and claimed herein as those constructions are covered in said patent, and in a divisional application of said parent application, Serial No. 422,057 filed Nov. 5, 1920, and reference may be had to said patent and application for a detailed description of those mechanisms.

In the present instance the various novel features comprised by the invention are shown embodied in a machine for use in a theatre where three classes of tickets are issued. The invention is, however, capable of use either as a whole or in its various parts in machines for other lines of business and in machines to issue tickets of either a larger or smaller number of classes. In other words, neither the line of business nor the number of classes of tickets is an essential feature of the invention.

The illustrative machine is, as is common with such machines, arranged to issue each class of tickets from a separate ticket strip. Ordinarily such machines have entirely separate feeding devices for each strip, in connection with mechanism whereby the devices for any desired strip may be caused to operate. One of the more specific objects of this invention is to simplify the ticket issuing mechanism as much as possible by providing two invariably moved strip feeding cylinders common to all of the strips instead of independent cylinders for each strip. Cooperating with these cylinders are key controlled rollers whereby the desired strip may be held in feeding engagement with the cylinders.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said drawings:

Fig. 1 is a front elevation of the complete machine with the doors in the front thereof opened to show the ticket strips and the manipulative devices for setting the price printing type carriers.

Fig. 2 is a top plan view showing the location of the various features in the machine. In this figure the outside casing and two of the keys are broken away and the key frames for one bank omitted so as to show clearly mechanism actuated directly by the keys.

Fig. 3 is a section taken on the line 3—3 (Fig. 2) looking in the direction of the arrows.

Fig. 4 is a detail of mechanism controlled by one of the banks of keys and also shows some of the connections whereby the manipulative devices for setting the type carriers are prepared for operation.

Fig. 5 shows some of the key controlled mechanism for determining the extent of movement of the driving mechanism and thereby the number of tickets to be issued.

Fig. 6 is a detail of a cam forming part of the mechanism shown in Fig. 5.

Fig. 9 is a left elevation partially in section of the lower part of the mechanism and shows particularly the driving motor and some of the connections whereby its movement is controlled and transmitted to the rest of the mechanism.

Fig. 10 is a front view of one of the ticket strips and devices immediately associated therewith, and also shows some of the driving mechanism and controlling connections for the motor.

Fig. 15 is a section taken on the line 15—15 (Fig. 13) looking in the direction of the arrows, with some of the parts broken away to expose others to view.

Fig. 16 is a detail of one of the cams for swinging the ticket feeding rollers into engagement with the common feeding and printing cylinders when a strip is to be printed and fed.

Fig. 17 is a section taken on the line 17—17 (Fig. 23) with the shell of the cylinder and some of the other parts omitted.

Figs. 18 and 19 show respectively the front and back of a ticket of one class, while Figs. 20 and 21 each show the front of a ticket of a different class.

Fig. 22 is a detail of the price printing type carriers and other mechanism contained in one of the feeding and printing cylinders common to all of the strips. In this figure the outside shell or casing of the cylinder has been omitted.

Fig. 23 is a section taken on the line 23—23 (Fig. 22) looking in the direction of the arrow and shows particularly devices for aligning the type carriers and locking them against movement after they have been set.

Fig. 24 is a section taken on the line 24—24 (Fig. 22) looking in the direction of the arrow and shows some of the devices for operating the locking arms for the price printing type carriers.

Figure 7:
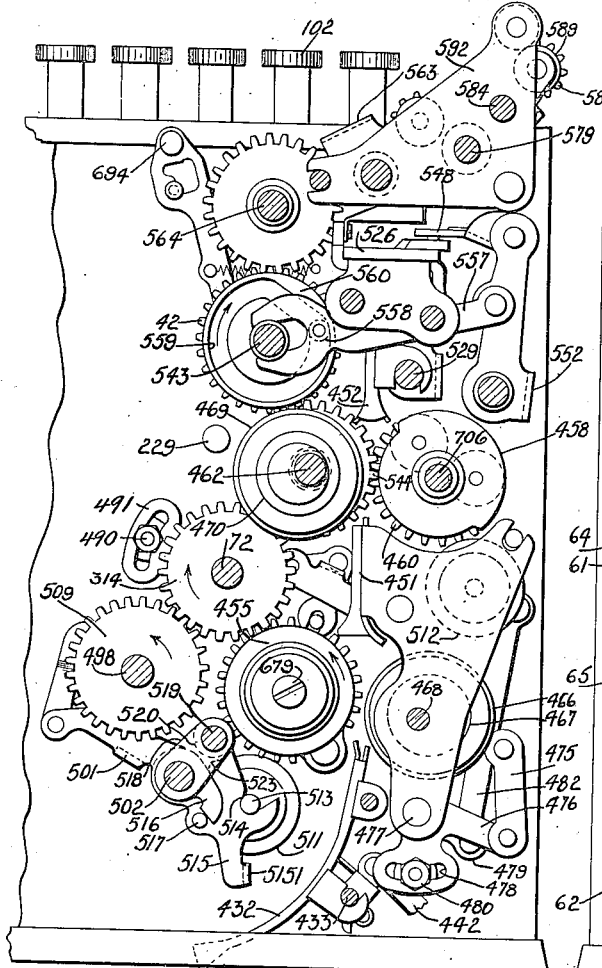
Fig. 7 is a section taken inside of the printer frame looking to the left.

Fig. 25 shows the construction and relative arrangement of the dating and numbering devices carried in the second of the feeding and printing cylinders common to all of the strips. In order to expose the parts clearly to view the outside casing or shell of the cylinder has been omitted and others of the parts cut away to show the connection between the various type wheels and the manipulative devices for turning them.

Fig. 26 is a section through the cylinder on the line 26—26 (Fig. 25) and shows some of the operating and aligning mechanism for the consecutive numbering devices.

Fig. 27 is a section taken through the cylinder on the line 27—27 (Fig. 25) looking in the direction of the arrows.

Fig. 28 is a section taken on the line 28—28 (Fig. 25) looking in the direction of the arrows. For the sake of clearness the end plate and hub of the cylinder has been omitted.

In the accompanying drawings the invention is shown embodied in a machine of a type which is now well known on the market and which is fully shown and described in United States Letters Patent, No. 1,302,600, issued May 6, 1919, to Francesco Skerl. This machine is only used however, because it seems to lend itself best to illustrating and explaining the invention and it is not the desire to be limited to this one embodiment of the idea. The invention is one which can be applied in various modifications and with almost equal facility to a number of other machines known in the art.

The machine shown in the Skerl Patent No. 1,302,600 is so constructed that its driving mechanism may be given a variable movement, the extent of movement depending upon the number of tickets to be issued, and as each ticket is issued the value thereof is added on a totalizer. Keys are employed for controlling the extent of movement and for determining the amounts to be added on the totalizer.

The machine shown and described herein has the variably operable driving mechanism just mentioned and has a keyboard containing three rows or banks of keys. These keys control the extent of movement of the driving mechanism and also determine the ticket strips from which the tickets are to be issued.

The machine is, in this instance, arranged to issue three classes of tickets. The ticket strips from which the tickets are issued may be of different colors so that the value of a ticket may readily be seen by the ticket taker. The purpose of the classes is, of course, immaterial, but for the sake of convenience they are generally referred to herein as children's, adult and box tickets and the same names will be used as far as possible in referring to the mechanism associated with each of the ticket strips.

As each ticket is issued the price is printed twice on its face, once on the main part of the ticket and once on a stub which may be detached from the ticket. These stubs may be used for various purposes, such as in voting contests, or they may simply be retained by the purchaser of the ticket to show that he is entitled to certain privileges. The prices, as previously stated, are printed on the tickets from type wheels which are rotatably mounted in one of the invariably moved strip feeding and printing cylinders common to the strips. Each of the type wheels is so located in the cylinder that only the type to print one amount can project far enough to make an impression when the cylinder is rotated. The type wheels are turned from one position to another to position different type at the printing point by operating the manipulative devices.

Normally the type wheels are all locked against rotation in the cylinder and are also normally disconnected from the manipulative devices. When a change in the price of the tickets of one or more classes occurs a manipulative device in the form of a lever projecting through the front of the machine is drawn forward, thereby operating through suitable connections to unlock the type carriers and connect them to the other manipulative devices, after which the latter may be operated to turn the type carriers. These latter manipulative devices are in the form of knurled disks having a part of their peripheries extending through the front part of the machine casing. Movement of these disks when they are turned is transmitted through a train of gears to the type carriers in such a way that the said type carriers are adjusted to their new positions, that is, the positions at which they will print the new prices as the tickets are issued. Indicators located at the front of the machine and visible through the top of the casing are so geared to the disks as to show at all times the amounts that the machine is prepared to print.

The foregoing is thought to give a good, general idea of the more important features of construction. The others need not be mentioned specifically here, but all of them which have any direct bearing upon the present invention are set forth in detail later on.

*Driving mechanism.*

The machine shown in the drawings is driven by an electric motor indicated generally by the numeral 40 (Fig. 9). A shaft 41 journalled at one end in a bracket 42 and at the other in an arm 43 (Fig. 10) formed on the machine frame 44 carries a clutch and circuit controlling mechanism designated generally by the numeral 45 whereby a driving connection may be established between the shaft 41 and the armature shaft 46 of the motor. As an incident to establishing such connection a pawl 47 is operated to depress the switch contact arm 48 to close the circuit through the motor. The motor and this clutch and circuit closing mechanism are all fully shown and described in United States Letters Patent 1,144,418 issued June 29, 1915 to C. F. Kettering and W. A. Chryst. The exact construction need not, therefore, be explained fully here, but reference may be had to the patent in question if more complete information is desired.

Figure 8:
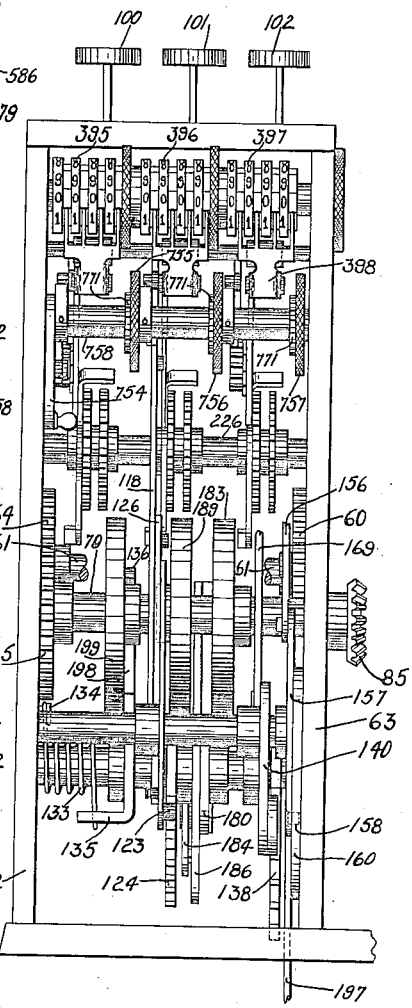
Fig. 8 shows in front elevation certain features of the driving mechanism and controlling devices therefor, also a number of the features of the price changing mechanism.

The shaft 41 has fastened thereto a pinion 50 (Figs. 9 and 10) meshing with the teeth of a gear 51 rotatably mounted on a stud 52 carried by the machine frame 44. The gear 51 serves through idle gears 53 and 54 to drive a gear 60 attached to the right end of a shaft 61. As shown in Fig. 8 this shaft is journalled at one end in the left hand side frame 62 and at the other in an intermediate frame 63. Fastened on the left end of the shaft 61 is a gear 64 (Figs. 3, 8 and 12) meshing with a gear 65 fastened to a shaft 70. The gear 64 also meshes with a gear 71 which is loosely mounted upon a shaft 72 and meshes with a gear 73 fastened to a shaft 74. Rigid with the gear 73 (Fig. 11) is a partial gear 75 having a locking portion 76 normally in engagement with a locking portion 77 formed on a partial gear 78 fastened to a shaft 79. The gearing just mentioned is so proportioned that for every two rotations given to the shaft 51 by the motor, the shafts 61, 70, 74 and 79 will each make a complete rotation, although because of the construction of the gears 75 and 78 the shaft 79 will complete its movement ahead of the others. The purpose of this will appear later. At each rotation of said shafts a ticket will be issued and the price thereof entered on a totalizer, the number of tickets issued depending upon the number of times that the shafts are permitted to turn.

The mechanism for controlling the operation of the electric motor and thereby the driving mechanism is similar to the mechanism shown in the Skerl Patent No. 1,302,600. This mechanism comprises an arm 82 (Figs. 9 and 10) which normally coacts with the clutch and circuit controlling device 45 in such a way that operation of the motor and rotation of the shaft 41 is prevented. When one of the keys is operated the arm 82 will be swung away from the clutch device 45 anywhere from one to five steps according to the key pressed. This frees the driving mechanism and starts the motor and at each rotation of the driving shaft 70 the arm is returned a step toward normal so that after the number of tickets required by the operated key have been issued the arm 82 will be fully restored to the normal position in which it is shown, thereby operating the mechanism 45 to disconnect the shaft 41 from the armature shaft 46 and break the circuit through the motor. The mechanism controlling the movement of the arm 82 will be described more or less in detail later.

In addition to its connections to the motor 40 the driving shaft 70 is provided with connections whereby it may be turned by an operating handle 84 (Fig. 2) at the front of the machine. The gear connections between the shaft 70 and the handle 84 are not shown and described herein. Reference may be had to the previously mentioned parent application now Patent No. 1,382,685 for a detailed description and illustration. All of the gears intermediate the operating handle 84 and the shaft 70 are so proportioned that the shaft will be given a complete rotation at each turn of the handle.

Keyboard.

As previously stated, the machine is in the present instance arranged to issue three classes of tickets, children's, adult and box tickets. Each of these classes is represented on a keyboard by a row of keys designated respectively by the numerals 100, 101 and 102 (Figs. 1, 2 and 8). The keys of each row are numbered from one to five thereby indicating the number of operations of the driving mechanism and consequently the number of tickets issued when a key is depressed. For example, if three children's tickets are desired, it is only necessary to press the "3" key in the bank or row designated by the numeral 100.

All of the keys are mounted in suitable frames in such a way as to be limited to endwise movement and are depressible against the tension of springs. These springs are not shown, but as is well known in the art, they are provided for the purpose of returning the keys to normal position after their work has been completed and the keys released. Depression of any key in any bank releases the operating mechanism and also releases mechanism which locks the depressed key in and all of the other keys out.

At the left hand side of each row of keys is a plate 105 (Figs. 2 and 3) having inclined slots 106 cooperating with pins 107 extending crosswise through the keys. The plate 105 for the children's bank 100 is loosely supported at its rear end by a three armed element 108 attached to a rock shaft 109. The plates 105 for the adult and box banks are supported at their rear ends by single armed members which are also fastened to the rock shaft 109, so it is clear that the three plates 105 always have a unitary movement. Fastened to the arm 110 of the element 108 for the children's bank 100 is one end of a spring 111, the other end of which is fastened to a pin 112 fastened to the frame 62. The spring 111 is constantly under tension so that shoulders 113 on the plates 105 are normally held in contact with the key pins 107, thereby limiting the rearward movement of the plates. It is apparent that when any key is depressed its pins will cooperate with the associated slot 106 to draw all of the plates 105 forward against the tension of the spring 111, thereby bringing the portions 114 of the plates under the key pins 107 so as to lock out the undepressed keys in all of the banks. This movement of the plates 105 releases the operating mechanism, also the mechanism for locking a depressed key in until the operating mechanism has been operated a number of times corresponding to the numeral on the key.

At their forward ends the plates 105 are supported by arms 115 loosely mounted on a shaft 116. Rigid with arm 115 for the children's keys 100 is an arm 117 (Figs. 3, 5 and 8) to the forward end of which is pivoted the upper end of a link 118. At its lower end the link 118 is provided with a slot 119 into which projects a pin 120 attached to the rearwardly extending arm of an element 121. A downwardly extending arm of the element 121, which is loosely mounted on a cross rod 122, is provided with a flat sided stud 123 normally in engagement with the uppermost one of a series of teeth formed in the forward end of a lever 124. The lever 124 is fastened to a rock shaft 125 suitably mounted in the frames 62 and 63. A lever 126 is loosely mounted on the rearwardly extending arm of the element 121 by a stud in axial alinement with the pin 120. This lever 126 near its upper end has two shoulders 127 and 128, the upper one of which is normally in engagement with a flat sided stud 129 projecting laterally from the link 118. The lever 126 is normally held in this position by a spring 132 which is connected at its forward end to the lower end of the element 121 and at its rearward end to the lower end of the lever 126. It is apparent that when a key is depressed and the plates 105 moved forward by the pin 107 in the key the arm 117 and link 118 will be moved downward, thereby causing the element 121 to be rocked counter clockwise (Figs. 3 and 5) to carry the stud 123 out of engagement with the uppermost tooth on the lever 124. When the stud 123 is moved out of engagement in this manner the shaft 125 is rocked counter clockwise, as viewed in Figs. 3 and 5 by a spring 133 (Figs. 3 and 8) which is coiled about the shaft 125 and is bent at one end about a stud 134 attached to the left side frame 62, the other end being bent around a laterally projecting lug 135 on an arm 136 rigidly mounted on the shaft 125. The purpose of this arm will appear later. Fastened to the shaft 125 is also a stepped plate 138 (Figs. 3, 4 and 8) which is normally so positioned that an arresting tooth 139 attached to a bell crank 140 is one step of movement above the uppermost step 141 on the plate 138. If the "1" key is depressed in any of the three banks the bell crank 140 is not moved so that after the rock shaft 125 is turned one step further movement of the shaft in the same direction will be prevented. If any key above "1" is depressed the bell crank 140 will be rocked as hereinafter described so as to bring its arresting tooth 139 in position to engage whichever one of the steps 143 corresponds to the number of tickets desired.

When the shaft 125 is rocked by the spring 133 at the time the stud 123 is disengaged from the teeth of the lever 124, a plate 145 (Figs. 2 and 3) at the left hand side of each bank of keys is moved rearward on supporting rods 146 and 147 at the front and rear respectively to carry one of the hooks 148 on the plate above the pin 107 of the depressed key, the other hooks 148 passing under the pins of undepressed keys. Each of the plates 145 is provided with a slot 151, these slots engaging studs 152 attached to arms 153 fastened to a rock shaft 154. Secured to the rock shaft 154 is also an arm 155 connected by a link 156 to a lever 157 loosely mounted on the rod 122. The lower end of the lever 157 carries a stud 158 (Figs. 3, 8 and 9) projecting into a cam slot 159 in an arm 160 fastened to the rock shaft 125. The cam slot 159 is so shaped that when the stud 123 is disengaged from the teeth of the lever 124 and the shaft 125 rocked by the spring 133 the first movement of the shaft will cause the lever 157 to be rocked clockwise (Figs. 3 and 9) thereby swinging the arms 153 rearward and sliding the plates 145 into locking position. When the shaft 125 is restored to normal position as hereinafter explained the cam slot 159 will, during the last step of movement of the shaft, act reversely through the connections described to slide the plates 145 forward and thereby release the depressed key.

The bell crank 140 is positioned to control the extent of movement of the stepped plate 138 directly by depression of the keys. For this purpose at the right of each of the three banks of keys there is provided a plate 165 (Figs. 2 and 4) supported at its rear end by an arm 166 loosely mounted on the rock shaft 109 and at its forward end by an arm 167 fastened to the shaft 116. Attached to the shaft 116 is also an arm 168 connected by a link 169 (Figs. 4 and 8) to the bell crank 140. Each of the plates 165 has five slots 171, the slots 171 cooperating with the "1" keys being vertical so that when a "1" key is depressed in any bank no movement is given to the plates. The other slots are differentially inclined so that the higher number keys will give the plate different extents of movement. This differential movement is transmitted through the intervening connections to the bell crank 140 so as to differentially position the bell crank and thereby predetermine the extent of movement to be given the rock shaft 125 when it is released.

It is clear that the sets of plates 105, 145 and 165 have a unitary movement and that depressing keys bearing the same numerals in the three banks has exactly the same effect upon the operating mechanism. In addition to the plates 105, 145 and 165 there is associated with each bank a plate 174 which is moved only when a key is depressed in the bank and which serves to connect the printing mechanism for that particular class of tickets to the driving mechanism. This part of the construction need not be described in detail here but will be explained fully later on.

*Operating mechanism.*

As previously stated, when the machine is released the arm 82 (Fig. 9) controlling the clutch and circuit mechanism 45 is swung away from its normally effective position a number of steps corresponding to the key operated and is then returned toward its normal position one step at each rotation of the driving shaft 70. The mechanism whereby the arm 82 is restored to normal position is fully shown and described in the Skerl Patent No. 1,302,600 hereinbefore mentioned and will be described but briefly here.

A bell crank lever 180 (Figs. 3, 5 and 8) loosely mounted on the shaft 125 carries at the upper end of its vertically extending arm a roller 181 projecting into a cam groove 182 formed in a disk 183 fastened to the shaft 70. This shaft, it will be recalled, makes a complete rotation at each operation. The rearwardly extending arm of the bell crank 180 carries a centrally pivoted lever 184 which at its lower end carries a pin 185 projecting into a cam slot 179 formed in the rearwardly and downwardly extending arm of a bell crank 186 also loosely mounted on the shaft 125. The vertical arm of the lever 186 carries a roller 187 (Fig. 6) projecting into a cam groove 188 formed in a disk 189 fastened to the shaft 70.

Toward the end of each rotation of the shaft 70 the bell cranks 180 and 186 are rocked counter clockwise (Fig. 5) as a unit by their respective cam grooves. The bell crank 186 is then rocked slightly clockwise (Fig. 5) relative to the bell crank 180 so that the lever 184 is rocked clockwise about its pivot because of the cam slot and pin connection 179 and 185, to carry a square-sided stud 191 on the upper end of the lever into engagement with the lower face of whichever tooth 192 is at that time opposite the stud, these teeth being formed in the rearward end of the lever 124. The bell cranks 180 and 186 are then rocked clockwise as a unit. This, because of the engagement of the stud 191 with the tooth 192, returns the lever 124 and the rock shaft 125 one step toward normal position. Near the very end of a cycle of operation the bell crank 186 is rocked slightly counter clockwise (Figs. 3 and 5) relative to the bell crank 180 so that the lever 184 is rocked counter clockwise to withdraw its stud 191 from engagement with the tooth 192.

Just before the stud 191 is disengaged the element 121 is rocked so that its stud 123 is carried into engagement with the upper face of whichever tooth on the lever 124 is at the time opposite the stud 123 thereby retaining the lever 124 in the position to which it has just been moved by the stud 191. To accomplish this retaining movement a stud 195 (Fig. 6) projecting from the side of the disk 189 engages the upper end of the lever 126, thereby rocking the lever to carry its upper shoulder 127 out of engagement with the stud 129 on the link 118. The spring 132 immediately rocks the element 121 clockwise (Fig. 5) to carry the stud 123 into engagement with the teeth of the lever 124.

In order to insure positive movement of the element 121 the vertical arm of the element has a nose 196 which is engaged by the stud 195 to rock the element if this has not already been accomplished by the spring 132. Upon each rotation of the shaft 70 the bell cranks 180 and 186 are operated, as above described, thereby restoring the shaft 125 one step and this is repeated until all of the parts have been restored to their normal condition.

The movements of the shaft 125, both releasing and restoring, are imparted to the motor controlling arm 82 through a link 197 (Figs. 3, 8, 9 and 10) connecting said arm to the plate or arm 160 fastened to the shaft. As the final step of restoring movement of the shaft 125 occurs the arm 82 reaches the position where it will stop the motor and disconnect the clutch.

In addition to the arm 82, the arm 136 (Figs. 3 and 8) previously mentioned is also provided to prevent the driving mechanism from moving past the stopping point. As before stated, this arm is fastened to the rock shaft 125 and when the shaft is turned at the time that the machine is released the arm will be moved counter clockwise (Fig. 3) thereby disengaging the nose at the upper end of the arm from a block 198 fastened to the side of a disk 199 attached to the driving shaft 70. The final step of restoring movement of the shaft 125 brings the nose on the arm back into position to engage the block 198 just before the block reaches the normal position in which it is shown.

Totalizer.

The present machine has a cash totalizer 200 and a total ticket counter 201 (Fig. 2) which are substantially the same in construction and operation as the ones shown and described in the Skerl Patent No. 1,302,600, hereinbefore mentioned. As this counter and totalizer form no essential part of the present invention, they are not shown or described herein in detail. Reference may be had to the Skerl patents hereinbefore referred to.

Differential mechanism.

A shaft 229 is turned differentially in the same direction by three independently operable actuators, one for each of the three classes of tickets. These actuators are operated by the driving shaft 79. For each of the three classes of tickets the shaft 79 has rigidly attached thereto a gear 307 (Figs. 3, 11, 12 and 13) meshing with gears 308 loosely mounted on sleeves concentric to the shaft 72. At the side of the gear 308 for the children's bank is a gear 309 fastened to the shaft 72. At the side of each of the gears 308 for the adult and box banks respectively are gears 310 and 311 fastened respectively to sleeves 312 and 313 concentric to the shaft 72. Fastened to the shaft 72 is a gear 314 for operating the children's ticket feeding mechanism while the sleeves 312 and 313 carry gears 315 and 316 for operating the feeding mechanism for the adult and box ticket strips. The feeding mechanism operated by these gears will be described later on.

The gears 309, 310 and 311 mesh respectively with gears 318, 319 and 320 (Fig. 12) loosely mounted upon the shaft 229. At the side of each of the three gears last mentioned is a gear 321 also loosely mounted upon the shaft 229. Broad tooth pinions 325 are normally in engagement with the gears 321 and their companion gears so that movement of the latter will be imparted to the former. Rigid with each of the gears 321 is a cam plate 326 (Figs. 11 and 12), a locking plate 327 and an actuator. These actuators are in the form of partial gears, the actuator 328 for the children's tickets having ten teeth, the actuator 329 for the Adult tickets having fifteen teeth and the actuator 330 (Fig. 11) for the box tickets having twenty teeth. Each tooth represents a possible step of rotation of the units element of the totalizer 200. Adjacent the children's, adults' and box actuators respectively are gears 331, 332 and 333, all fastened to the shaft 229. When it is desired to operate one of the three actuators the corresponding gear 308 on the shaft 72 is coupled to its companion gear by a broad-toothed pinion 335. For example if the actuator 328 for the children's tickets is to be operated the gears 308 and 309 (Fig 13) may be coupled together, thereby causing the gear 318, the broad tooth pinion 325 and the gear 321 to which the actuator 328 is rigidly attached, to be rotated when the driving shaft 79 is turned.

The pairs of gears on the shaft 72 are coupled together directly by operation of any key in the corresponding row or bank. For the purpose of so connecting the pairs of gears together and thereby effecting a driving connection between the shaft 72 and the actuator, there is provided for each pair of gears a broad tooth pinion 335 (Figs. 4, 11 and 12) loosely mounted on an arm 336 of an element 337. These elements are loosely mounted upon the shaft 229 and each of them carries a stud 338 (Figs. 4 and 11) engaging a notch in a downwardly extending portion 339 of the corresponding plate 174. The plates 174, it will be recalled, are independently movable, that is to say, they have no unitary movement like the plates 105, the plates 145 and the plates 165. All three of the plates 174 are slidably supported on the rods 146 and 147 and are provided with inclined slots 340 to cooperate with the pins 107 in the keys. It is clear that depression of any key in a bank will slide the plate 174 for that bank forward and that this will rock the connected element 337 about the shaft 229 to engage the broad tooth pinion 335 with the pair of gears on the shaft 72. Then when the driving shaft 79 is turned, as previously described, movement will be transmitted through the engaged broad tooth pinion 335 to the actuator 328, 329 or 330 associated with the bank containing the operated key.

Figure 11:
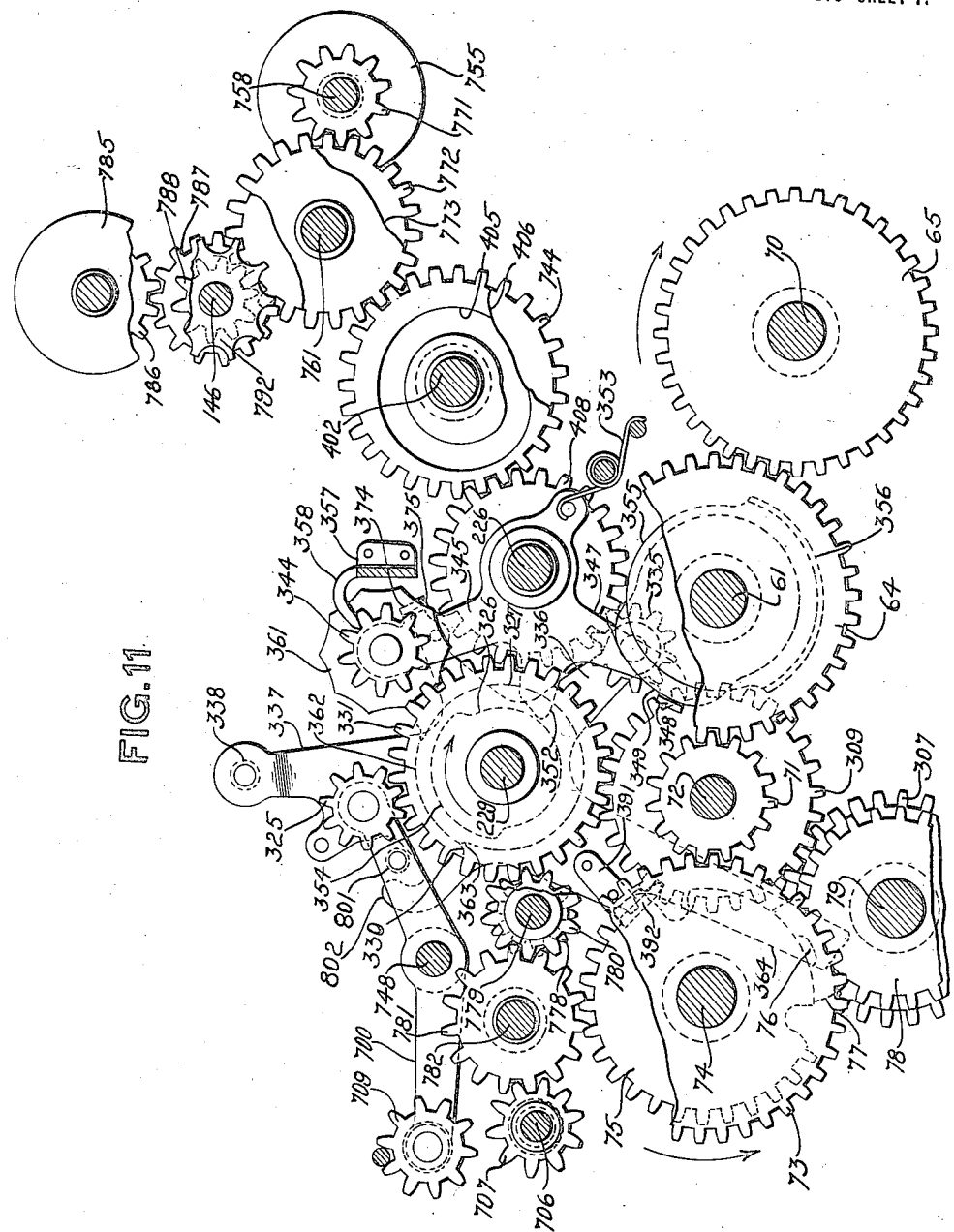
Fig. 11 shows in detail some of the driving mechanism and some of the price changing mechanism.

Movement of the actuator which has in this way been connected to the driving mechanism is transmitted to the associated gear 331, 332 or 333 attached to the shaft 229 through a broad tooth pinion 344 (Figs. 3, 4, 11 and 12). These pinions 344 are rotatably mounted upon upwardly extending arms of elements 345 loosely mounted on a shaft 226. Each element has a downwardly extending arm 347 (Figs. 4 and 11) provided with a laterally extending lug 348 normally resting against the edge of a cam 349 (see also Fig. 12) fastened to the shaft 61. Each element 345 also has an arm 352 to engage the associated cam plate 326. Springs 353 at all times tend to rock the elements 345 clockwise (Fig. 11). When an element 337 has been operated to engage its broad tooth pinion 335 with the pair of gears on the shaft 72 and the shaft 79 turned, the cam plate 326 will be turned in the direction of the arrow until its operating portion 354 engages the arm 352 and rocks the element 345 counter clockwise, thereby engaging the broad tooth pinion 344 with the gear 333, but said gear will not be turned until the actuator has traveled far enough for its teeth also to engage the broad tooth pinion. Then the gear and actuator will, because of the connection afforded by the pinion 344, turn as a unit and this movement of the gear 333 will, of course, cause rotation of the shaft 229. It is to be understood, of course, that the shaft 61 will have been turned far enough to carry the cam 349 out of engagement with the lug 348 before element 345 is rocked. The operating portions 354 of the cam plates 326 are of sufficient length to hold the pinions 335 in engagement during a comparatively small part only of the rotation of the actuators. In order to hold them in engagement until the actuators have completed their work there is provided for each actuator a plate 355 fastened to the shaft 61 and having a flange 356 which will engage the portion 348 of the element 345 before the operating portion 354 of the cam 326 passes out of engagement with the arm 352, said flange then holding the element 345 with the pinion 344 engaged until near the end of the rotation of the shaft 61. As the flange 356 is carried out of engagement with the portion 348 said portion will be engaged by the cam 349, thereby rocking the element 345 back to its original position against the tension of the spring 353. It will be remembered that in describing the driving mechanism attention was directed particularly to the fact that the shaft 79 completes its rotation ahead of the shafts 61, 70 and 74. By this construction any actuator driven by the shaft 79 will complete its movement and be stationary before the cam 349 attached to the shaft 61 rocks the element 345 to disconnect the actuator.

Thus it is that a broad tooth pinion 344 will be moved to contact with either gear 331, 332 or 333 and later be contacted by an actuator 328, 329 or 330 and drive shaft 229 until actuator 328, 329 or 330 is stopped. When the actuator is stopped the broad tooth pinion may remain in contact with its associated parts until member 345 is released from action of locking flange 356.

In order to be sure of correct relationship at all times between each pinion 344 and the gear and actuator cooperating therewith, there is provided a cross bar 357 (Figs. 4 and 11) having fingers 358 to engage the pinions 344 when the pinions are disengaged. Rigid with each of the pinions 344 is a locking plate 361, the curved cuts in the periphery of which will, when the elements 345 are rocked by their keys, engage portions 362 (Fig. 11) of the peripheries of the locking plates 327 rigid with the actuators. The locking plates 327 are cut away as at 363 to permit rotation of the locking plates 361 when their pinions are driven by the actuators, but at all other times the locking plates 327 and 361 cooperate to hold the pinions 344 against rotation.

Means are provided whereby it is impossible to operate two of the elements 337 at a time. Each of these elements has a downwardly extending arm 364 (Fig. 4). These arms each have a slot 365, each slot being at a different angle from the others. Cooperating with these slots are studs 366 (Fig. 3) projecting from arms 367 fastened to a shaft 368. Attached to the shaft 368 is also an arm 369 connected by a spring 370 to a fixed pin 371. When any element 337 is rocked by depression of one of its keys the slot 365 in the element will engage the corresponding pin 366 and either hold the shaft 368 stationary or rock it in one direction or the other. After the key is fully depressed and locked in by the plate 145 the arm 367 will be held stationary thereby, on account of the different inclinations of the slots, preventing movement of a second element 337.

In addition to this, means are also provided for preventing engagement of any pinion 344 except the one associated with the operated key. This is merely a precaution to prevent trouble in case one of the springs 353 should become broken or weak. Otherwise if a spring became ineffective as soon as the cam 349 was carried out of engagement with the projection 348 the element 345 would be free to move to engage its pinion 344. Each of the elements 345 has formed thereon a lug 374 projecting across the forward end of an arm 375 of the elements 337. It is apparent that these arms will be in position to intercept the lugs 374 so long as the elements 337 are in normal position but when an element is rocked by operation of a key the arm will be carried out of the path of the lugs, thereby freeing the element 345 for operation.

Mechanism is also provided for locking the operated element 337 in operated position and for retaining the pairs of gears on the shaft 72 in proper relation between operations. For this purpose, loosely mounted on the shaft 79 are three arms 376 (Fig. 3) each having a locking portion 377 long enough to engage the teeth of a pair of the gears on the shaft 72. Pivoted to each arm 376 is a link 378 loosely connected to an arm 379 loose on a rod 380. Rigid with the arms 379 are arms 381 each having a tooth 382 to engage a notch 383 in the lower end of the corresponding element 337. Rigid with each arm 376 is an arm 385 (Figs. 3 and 12) carrying a stud 386 projecting into a cam groove in a disk 388 fastened to the shaft 74. The shape of the cam grooves is such that at the beginning of an operation of the driving mechanism the arms 376 will be rocked to withdraw the portions 377 from engagement with the gears on the shaft 72 and at the same time the arms 381 will be swung upward to engage the tooth 382 for the operated element 337 with the notch 383 in said element. The arms are all held in this position until just at the end of the rotation of the shaft 79 when the parts are all restored to normal position, thereby freeing the element 337 so that the key, when released, may be returned by its spring.

In addition to the arms 376 for holding the pairs of gears on the shaft 72 in position between operations there is provided a device for holding in alignment the gears 309, 310 and 311 for the banks in which no keys are operated during operations of the machine. For this purpose each of the elements 337 is provided with a plate 391 (Figs. 4 and 11) having a laterally extending portion 392 wide enough to engage the teeth of the corresponding gear. It is clear that when a key is depressed in a bank and the element 337 for the bank operated, as previously described, the aligning portion 392 will be disengaged from the teeth of its gear while the other two elements 337 for the banks in which no keys are operated will hold their aligning portions 392 in engagement with their gears so as to prevent their being displaced.

As so far described, the actuators 328, 329 and 330 have a fixed relation to their driving mechanism and in the positions shown they would be effective to add respectively, fifty cents, seventy-five cents and one dollar on the totalizer 200. As will be fully explained later, however, the broad tooth pinions 325 connecting the driven gears 318, 319 and 320 with the corresponding gears 321, may be disengaged and the gears 321 then turned so as to move the actuators rigid therewith in a counter clockwise direction (Fig. 11), to cause each of the actuators to add lesser amounts. The broad tooth pinions are then reengaged with their gears, thereby holding the actuators in their new relations.

*Ticket counters.*

In addition to the grand total ticket counter previously mentioned, the machine has a counter 395 (Figs. 2 and 8) for the children's tickets, a counter 396 for the adult tickets and a counter 397 for the box tickets. These counters are to show the number of tickets issued from their respective strips and are constructed on the deep notch principle. Associated with each counter is a spring pressed operating pawl 398 (Figs. 3 and 8) mounted on an arm 399 loose on a rod 400. Pivoted to each arm 399 is one end of a pitman 401 slotted at its rear end to engage a rod 402 mounted in the frames 62 and 63. Collars 403 on the rod 402 prevent the rear ends of the pitman from moving laterally on the shafts. Each pitman carries a roller 404 projecting into a cam groove 405 formed in the side of a gear 406 loosely mounted on the rod 402. In order to permit making the cam grooves deep enough to get good bearing surfaces for the rollers 404, each of the gears 406 has integral therewith a portion 407 (Fig. 12) into which the cam grooves extend. The gears 406 mesh with gears 408 loose on the shaft 226 and the gears 408 in turn mesh with the gears 321. It will be recalled that when a key is depressed the corresponding gear 321 is caused to make a complete rotation at each operation of the driving mechanism. This rotation is transmitted through the gear 408 to the cam gear 406 for that bank. The shape of the cam grooves 405 is such that at each rotation of a cam gear its pitman 401 will be reciprocated, thereby actuating the pawl 398 to add one on the ticket counter. From the foregoing it is clear that the mechanism described affords a means for indicating the number of times that each ticket mechanism is operated and that if all are reset at the same time the sum of the numbers on the counters 395, 396 and 397 should be the same as the number on the total ticket counter.

*Printing and feeding mechanism.*

The tickets for the different classes are drawn from the usual supply rolls. As shown in Figs. 1, 9 and 10, these rolls are located in the lower part of the machine. Each supply roll is mounted in a frame 410 arranged to slide in and out of the machine. Near their forward ends the side plates of each frame 410 are provided with studs 411 and 412 to engage notches 413 in the ends of plates 414 fastened to the base of the machine. At their rear ends the frames 410 are provided with notches 415 to engage a rod 416 extending across the rear of the compartment for the supply rolls. This construction permits withdrawing the desired frame when it is desired to change the paper or put in a new roll of ticket strip.

In Fig. 1 the children's, adult and box supply rolls are designated respectively by the numerals 418, 419 and 420. It will be noticed that this relative arrangement of the rolls is the reverse of the relative arrangement of the children's, adult and box key banks designated respectively by the numerals 100, 101 and 102. This is due to the fact that, as previously explained, the printing mechanism for the children's tickets is driven by the shaft 72 when one of the gears 308 and gear 309 (Fig. 13) are coupled together while the adult and box mechanisms are driven respectively through the sleeves 312 and 313 concentric to the shaft 72 when gears 308 and 310, and 308 and 311 are coupled together by broad tooth pinions 335. It is apparent that this arrangement of the sleeves and shaft accounts for the difference just referred to between the relative arrangement of the three key banks and the corresponding ticket strips.

From the supply rolls the ticket strips pass upward over rollers 425 (Figs. 9 and 10) into chutes 426, there being a roller 425 and chute 426 for each of the strips. These rollers and chutes are supported in frames 427 loosely mounted on a rod 428 and having attached thereto guide plates 423 for the strips. Springs 429 wound around the rod 428 engage the frames and a rod 430 in such a way that they are constantly under tension and hold shoulders 431 on the frames against the rod 430. When it is desired to insert the ticket strip through a chute the forward end of the frame 427 may be drawn down so as to give ready access to the chute. After the strip has been partially inserted in the chute 426 the frame 427 may be released, whereupon the spring 429 will return the frame to normal position. Further inserting movement of the strip will then cause the strip to enter a second chute 432 (Figs. 7, 9, 10 and 15). These chutes 432 are stationary and are supported by a shaft 433 and a rod 434.

In order to prevent backward movement of the ticket strips each of the chutes 432 has a slot (not shown) across the rear side thereof through which projects a blade 435 formed on a yoke 436, the side arms of which are pivoted on the shaft 433. Wound around the shaft 433 is a spring 437 for each yoke 436. One end of each spring engages the rearward edge of the blade 435, the other end of the spring being in engagement with a stud 438 attached to an arm 439 fastened to the rock shaft 433. Fastened to the rock shaft 433 is also an arm 441 connected by a link 442 to the upper end of a lever 443 journalled on a stud 444. The lower end of the lever 443 is pivoted to a link 445, which at its forward end is provided with an L shaped slot 446 engaging a stud 447 attached to the machine frame 44. The forward end of the link also carries a knob 448. In the normal position in which the parts are shown the spring 437 holds the plate 435 against ticket strip with sufficient force to prevent the strip from moving backward of its own weight, but still the tension is not strong enough to interfere materially with the operation of the printing mechanism. When it is necessary to insert a new strip the operator will first draw the link forward and then lower it to engage the vertical portion of the slot in the link with the stud 447. The forward movement of the link will rock the lever 443 on its pivot 444 and also cause a rocking movement of the shaft 433. The first part of the movement of the shaft 433 will at least partially relieve the tension of the springs 437 and the latter part of the movement of the shaft will carry the studs 438 into engagement with arms 450 rigid with the yokes 436, thereby swinging the yokes rearward to withdraw the blades 435 from the chute 432 so that the blades will not interfere with the insertion of the strips. After the strips are fully inserted the link 445 is raised to disengage the vertical portion of the slot from the stud and is then thrust rearward by the operator thereby returning the blades 435 into engagement with the ticket strips and again placing the springs 437 under tension. The link is maintained in this position by the door of the cabinet as is obvious from the showing in Fig. 1.

From the chutes 432 the strips pass upward through chutes 451 (Figs. 7 and 15) and through chutes 452 and 453. This path of movement of the strips carries them successively past the devices for printing on the backs of the tickets, the devices for printing on the faces of the tickets, mechanism for severing tickets from the strip and, lastly, devices for ejecting the severed tickets from the chute 453. The mechanism whereby these functions are performed will next be described.

The devices for printing on the back of the check comprise a cylinder 455 (Figs. 7, 12, 15 and 25) fastened to the driving shaft 79. This cylinder is long enough to cooperate with all three of the ticket strips and carries either on its surface or in its interior type carriers for printing on the backs of the tickets all of the matter shown in Fig. 19. In addition to the type carriers the cylinder 455 carries a toothed blade 454 (Figs. 26 and 27) for perforating the tickets on the line 456 so that the stub 457 may readily be detached from the tickets. Owing to the fact that the cylinder 455 is fastened to the shaft 79 the cylinder will make a complete rotation at each operation of the driving mechanism. The matter on the faces of the tickets shown in Figs. 18, 20 and 21 is all printed from type carriers, either attached to or mounted in a cylinder 458 (Figs. 7, 12, 15 and 22). This cylinder is rotatably supported at its end in the frame 63 and the printer side plate 459 (Fig. 13) and is long enough to cooperate with all three of the ticket strips. Rigid with the cylinder 458 is a gear 460 (Figs. 12 and 15) meshing with a gear 461 loosely mounted on a rod 462. The gear 461 in turn meshes with the gear 463 (Fig. 13) attached to one end of a sleeve 464 to the other end of which is fastened the gear 308 for the box ticket mechanism. As the gear 308 is given a complete rotation at every operation of the driving shaft 79 it is apparent that the cylinder 458 will also be given the same extent of movement.

Cooperating with the cylinder 455 are three impression rollers 466 (Figs. 7 and 15), one for each of the ticket strips. These rollers are rotatably mounted on eccentrics 467 journalled on a rod 468. Cooperating with the cylinder 458 are three rollers 469 (Figs. 7, 13 and 15) loose on eccentrics 470 journalled on the rod 462. When tickets are to be fed and printed from a ticket strip the eccentrics 467 and 470 for that strip are rotated on their supporting rods far enough to carry the rollers 466 and 469 toward cylinders 455 and 458 to press the ticket strip against the peripheries of the cylinders. The eccentrics remain in rotated position until the end of the rotation of the shaft 79 when the eccentrics are reversely rotated to carry the rollers 466 and 469 back to their normal positions.

For the purpose of rotating the eccentrics, each eccentric 467 has rigid therewith a plate 473 (Figs. 7 and 15). This plate has an arm 474 connected by a link 475 to one arm of a bell crank 476 loosely mounted on a rod 477. The other arm of the bell crank is provided with a slot 478 through which projects a screw fastened to the downwardly extending arm of a second bell crank 479 also loosely mounted on the rod 477. The screw just mentioned is provided with a nut 480 (Fig. 7). The arrangement is such that the bell crank 476 may be shifted to different positions with reference to the bell crank 479 and the nut then tightened to hold the bell cranks in the relative positions desired. The rearwardly extending arm of each bell crank 479 is connected by a link 482 to the rear end of an arm 483 of a yoke 484 loosely mounted on the rod 485. A forwardly extending arm 486 of the yoke carries a stud 487 engaging a notch in the rear end of an arm 488 forming a part of a plate 489 rotatably mounted about the shaft 72. The forwardly extending arm of the element 489 has an adjustable connection 490 similar to that above described with an element 491 which is also rotatable about the shaft 72. The element 491 is provided with teeth 492 meshing with the teeth 493 formed on a plate 494 rigid with the eccentric 470 while the element 489 carries a small segment 496 the teeth of which mesh with teeth formed on a plate 497 loosely mounted on a rod 498. The element 497 is connected by means of a link 499 to one arm 500 of a yoke 501 loosely mounted on a rod 502. The arm 500 of each yoke carries a stud 503 projecting into a cam groove 506 (Fig. 16) formed in the side of a disk 507 loose on the rod 498. Rigid with each of the cam disks 507 is a gear 509. These gears mesh with the gears 314, 315 and 316 for the children's, adult and box tickets respectively. From the foregoing it is clear that when, for example, the gears 308 and 309 for the children's tickets are clutched together by the broad tooth pinion 335 and the shaft 72 then rotated by operation of the driving mechanism the gear 314 attached to the shaft will drive the gear 509. This will cause the cam groove 506 in the disk 507 rigid with the gear 309 to rock the eccentrics 467 and 470 and move the rollers 466 and 469 for the children's tickets into the position where they will press the children's ticket strip against the cylinders 455 and 458 so that when the cylinders are rotated the strip will be printed and fed.

The ink for the printing type carried by the cylinders 455 and 458 is supplied by rollers 511 and 512 respectively. A pair of these rollers is provided for each ticket strip and they are only permitted to move into inking engagement with the cylinders when the mechanism for their particular strips is to be operated. For this purpose the rollers are provided with bearing rods 513 the ends of which engage notches 514 in plates 515. These plates are loosely mounted on the rods 502 and 485 and are provided with springs (not shown) which are constantly under tension and tend to swing the plates in the proper direction for their rollers to contact the surfaces of the cylinders. This is normally prevented, however, by the yokes 501 and 484. The yokes 501 have rigid therewith arms 516 engaging studs 517 projecting from the plates 515. It is apparent that when the yokes are rocked about the rods 502, as previously described, the arms 516 will be moved out of engagement with the studs 517, thereby permitting the inking rollers 511 to move into contact with the surface of the cylinder 455. The mechanism controlling the inking rollers 512 is substantially the same as just described, so the description need not be repeated. All of the plates 515 have finger pieces 5151 to permit rocking the plates 515 when it is desired to remove the inking rollers.

Rigid with the rod 502 are arms 518 in the upper ends of which is mounted a rod 519. Loosely mounted on this rod are sleeves 520 (Figs. 7, 13 and 15) carrying small eccentrics 521. Set screws 522 projecting through slots in the sleeves 520 and into the rod 519 afford a means whereby the sleeves may be set at different positions and then secured by the screws. The eccentrics 521 cooperate with shoulders 523 on the plates 515 and by setting the eccentrics to different positions the pressure of the inking rollers against their cylinders may be regulated. A rod 524 (Fig. 15) carries a similar set of eccentrics cooperating with the frames supporting the inking rollers 512.

After the strip has been printed and fed by the cylinders 455 and 458 it passes into a chute 452. An auxiliary feeding device is provided for feeding the strip from the chute 452 through a slot (not shown) in a stationary knife 526 (Figs. 7 and 15) after which it is severed by the movable knife 5271. The auxiliary feeding device mentioned comprises a roller 527 rotatably mounted in the side plates of a frame 528 loosely mounted on a rod 529. A spring 530 wound around the rod 529 has one end engaging the cross plate of the frame 528, the other end of the spring being held by a stationary pin 531. The spring 530 is constantly under tension and when released is effective to rock the frame 528 clockwise (Fig. 15) so as to carry its roller 527 into feeding relation with a roller 532 loosely mounted on a rod 533. This action of the spring is normally prevented by an element 534 loosely mounted on the rod 533. The rearwardly extending arm of the element 534 has an inclined edge 536 engaging a stud 537 attached to the side plate of the frame 528. The other arm of the element 534 is at all times in engagement with a cam 541. Rigid with the cam 541 is a gear 542 loosely mounted on a rod 543 and meshing with a gear 544 loose on the rod 462. The gear 544 meshes with the gear 314, 315 or 316, depending upon the ticket strip. From this construction it is clear that when a gear 308 is coupled to a companion gear, as previously described, the gear 542 will be turned when the machine is operated, thereby rotating the cam 541 to permit the element 534 to rock counter clockwise (Fig. 15) whereupon the spring 530 will rock the frame 528 to carry its roller 527 into feeding engagement with the roller 532.

The roller 532 is rotated constantly during the operation. Rigid with the roller is a pinion 546 engaging the teeth of gear 542. By tracing the gearing through it will be seen that the gear 542 turns counter clockwise (Fig. 15) thereby causing clockwise rotation of the roller 532 to feed the ticket strip up through the knives.

Figure 13:
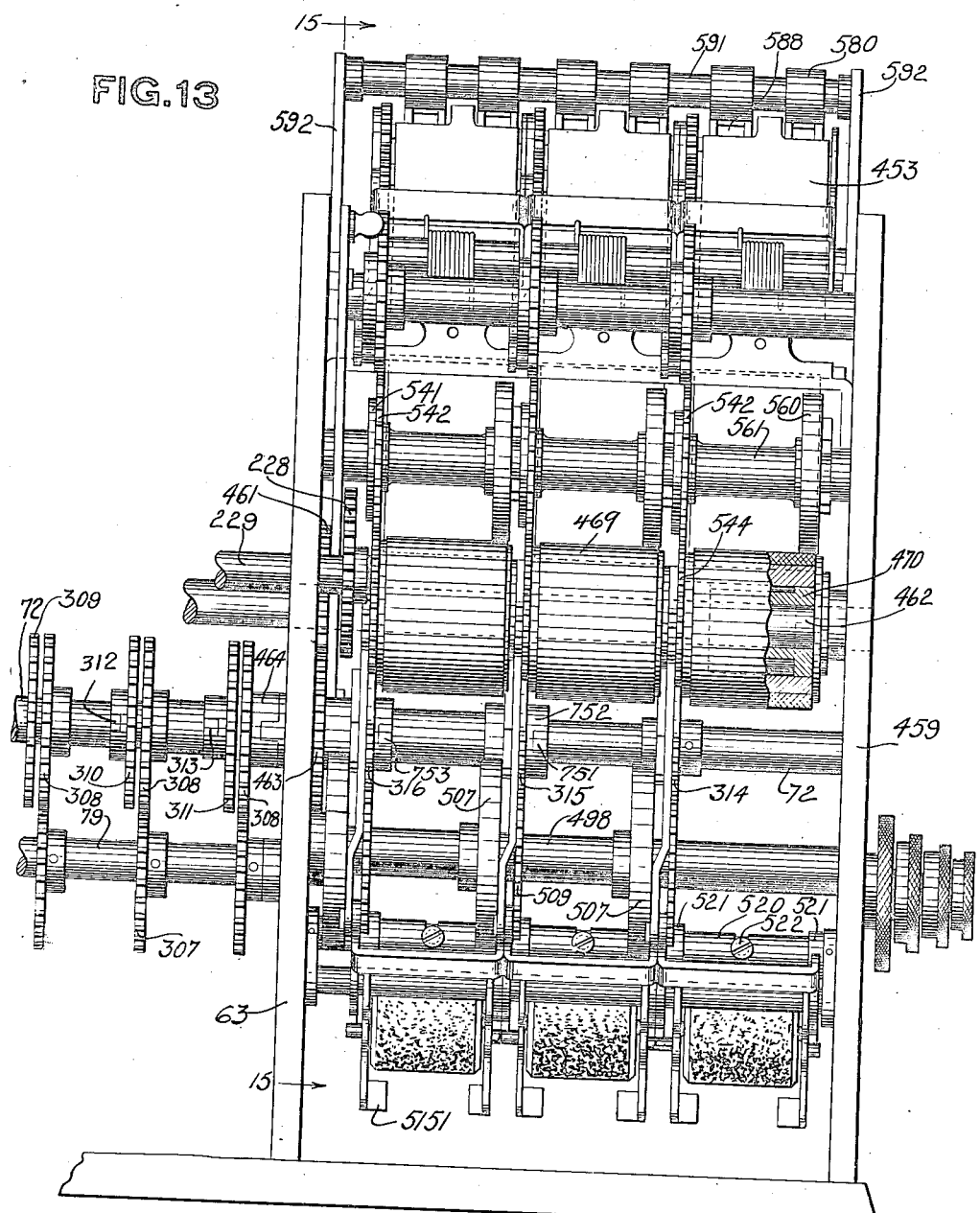
Fig. 13 is a front view of the assembled ticket printing and issuing mechanism and some of its operating connections.

The movable knife 5271 has holes (not shown) which are engaged by studs 548 projecting downward from the cross plate of a frame 549. This frame is journalled on a rod 550 supported by the side arms 551 of a frame 552 loosely mounted upon the rod 553. A torsion spring 556 holds the knife 5271 in contact with the upper face of the stationary knife 556. The right hand side arm of the frame 552 is pivotally connected to the rear end of a pitman 557 slotted at its forward end to engage the rod 543. A roller 558 projects from the pitman into a cam groove 559 (Fig. 7) formed in the side of a disk 560 attached to one end of a sleeve 561 (Fig. 13). This sleeve is concentric with the rod 543 and is fastened at its other end to the gear 542. This sleeve connection causes the cam 560 for a ticket strip to be operated whenever the mechanism for that strip is connected to the driving mechanism as hereinbefore described. The shape of the cam grooves 549 is such that the knives 5271 are operated at the beginning of the operation of the machine. The reason for this is that it is desirable to deliver tickets with as little delay as possible and the feeding mechanism is so arranged that the ticket is always printed and fed past the knife as the latter part of an operation and is then severed and ejected at the beginning of the next operation, so that there is always a ticket ready, which is issued without delay.

The check ejecting mechanism comprises a frame 563 (Figs. 7 and 15) loosely mounted on a rod 564. A torsion spring 565 engaging the cross plate of the frame 563 and a lug 566 formed on the plate supporting the stationary knife 526 tends at all times to rock the frame 563 counter clockwise (Fig. 15). This counter clockwise movement is normally prevented by engagement of a stud 569 projecting from an arm 570 formed on the frame 563 with the periphery of a cam 571. The cam 571 is rigid with a gear 572 loosely mounted upon a rod 573 and meshing with the gear 542.

Rotatably mounted on the rod 564 is a gear 574 meshing with a pinion 575 rigid with a feeding roller 576 rotatably mounted on a rod 577 supported by the side plates of the frame 563. Cooperating with the feeding roller 576 is a feeding roller 578 rotatably mounted on a rod 579. Rigid with the feeding roller 578 is a pinion 580. In the normal position of the parts the cam 571 holds the frame 563 in such a position that the roller 576 is far enough away from the roller 578 to prevent gripping the paper, although the teeth of the pinions 575 and 580 are long enough to remain in loose engagement. When the mechanism for a strip is operated and the gear 572 driven the cam 571 is carried out of engagement with the roller 569 to permit the spring 565 to rock the frame 563 to press the feeding roller 576 against the feeding roller 578. During this time the rollers 576 and 578 are being driven by the gear 572 and as gear 572 is much larger in diameter than the pinions 575 and 580 the feeding rollers 576 and 578 are rotated at a comparatively high speed in the proper direction to eject the ticket from the machine. This would probably be sufficient to eject the ticket properly, but as an additional safeguard, an auxiliary ejecting mechanism is provided. This auxiliary mechanism comprises a frame 583 (Fig. 15) loosely mounted upon a rod 584. Rotatably mounted on the rod 584 and inside of the frame 583 is a pinion 585 meshing with the pinion 580. The pinion 585 in turn meshes with a pinion 586 loosely mounted on a rod 587 supported in the side plates of the frame 583. Rigid with the pinion 586 is a sleeve 588 (Fig. 13) having feeding flanges 589 engaging rollers 590 loosely mounted upon a rod 591 journalled in the auxiliary frame plates 592 attached to the main frame members of the machine. A torsion spring 593 (Fig. 15) is constantly under tension to hold the feeding flanges 589 in engagement with the rollers 590.

As previously pointed out, the cylinder 455 for printing on the backs of the tickets is long enough to cooperate with all three of the ticket strips. Attached to the surface of the cylinder are type plates 596 and 597 (Figs. 26 and 27) for printing all of the matter on the backs of the tickets except the consecutive numbers and the dates. (See Fig. 19.) There are, of course, three sets of these type plates, one for each ticket strip. Mounted in the cylinder are a number of type carriers for printing the consecutive members and dates. As shown in Fig. 19 the consecutive number and date is printed twice on the back of each ticket, once on the body and again on the stubs 457. It is, therefore, necessary to have two sets of consecutive numbers and date type carriers for each of the strips.

The consecutive numbering type carriers 599 are constructed on the well known deep notch principle. They are rotatably mounted on shafts 600 and 601 (Figs 26 and 27), these shafts being supported at their ends by the end plates of the cylinder. Attached to the side of each consecutive number type carrier is a toothed disk 602. As will be seen from Fig. 26, the teeth of the disks for the two sets of type carriers are pointed in opposite directions. Cooperating with the teeth of these disks are the usual spring pressed pawls 603 and 604, there being a pawl for each set of consecutive number type carriers. The pawls 603 and 604 are loosely mounted on rods 605, these rods being supported at their ends by arms 607 fastened to a rock shaft 608. This rock shaft is journalled at its right hand end in the end plate of the cylinder and at its left end extends through the end plate of the cylinder. Attached to this left hand end of the shaft 608 is an arm 609 (Fig. 25) carrying a roller 610 (Fig. 15) projecting into a cam groove 611. This cam groove is formed in a plate 612 pivoted on a stud 613 and having a circular opening 614 surrounding the hub of the cylinder. The cam groove 611 is circular but the plate 612 is normally held in such a position that the cam groove is eccentric to the center of the cylinder. As the cylinder turns the arm 609 will be operated to rock the shaft 608 first counter clockwise (Fig. 26) and then clockwise. During the counter clockwise movement the pawls 603 will engage the teeth of the disks 602 for one set of type carriers and operate the carriers to add one. During this movement the pawls 604 will ride idly over the points of the teeth of the associated disks 602 but when the shaft 608 is rocked clockwise back to the position in which it is shown the pawls 604 will then engage the teeth on their disks 602 and operate the second set of consecutive number type carriers to add one. Owing to the fact that all three of the pairs of consecutive number of type carriers are operated by the rocking movement of the single shaft 608, it is apparent that all of the consecutive number type carriers will show exactly the same number. Spring operated pawls 616 (Fig. 26) are constantly held in engagement with the teeth of the disks 602 to prevent retrograde movement of the type carriers.

At the end of the day or any other desired period the consecutive number type carriers may all be simultaneously turned to zero. For this purpose the shafts 600 and 601 are provided with the usual square sided grooves 617 to cooperate with spring pressed pawls which are not shown herein, but which may, as is well known in the art, be pivotally attached to the type carriers. In order to rotate the shafts 600 and 601, there is fastened to each shaft a gear 619 meshing with a gear 620 (Figs. 25 and 28) fastened to the sleeve 621. Secured to the other end of the sleeve 621 is a flanged manipulating wheel 623 carrying a stud 624 pivotally supporting a pawl 625 which cooperates with notches in a nearly circular disk 622 secured to the end of the cylinder 455. The nose of this pawl normally engages a notch 626 in the edge of the element 622 and when the consecutive number type carriers are to be cleared the pawl is disengaged from the notch 626 by finger pressure applied to a portion 631 of the pawl extending through a slot 632 cut in the flange of the wheel 623 and then the wheel 623 is turned counter clockwise (Fig. 28) thereby rotating the shafts 600 and 601 counter clockwise (Fig. 26). This movement of the wheel is continued until the shaft 600 has made a complete rotation, during which time the square sided groove 617 in the shaft will engage the ends of the spring operated pawls (not shown) on the type carriers and turn the type carriers on the shaft 600 forward to zero. While this is occurring the shaft 601 is also turned in a counter clockwise direction, but owing to the difference in the direction in which the type carriers on the shaft 601 turn when operated by the pawls 603 the square sided groove 617 in the shaft 601 will simply ride idly under the ends of the pawls. When shaft 600 has made a complete rotation counter clockwise the pawl 625 snaps into the notch 633 to arrest the shaft 600 in the zero position. The nose of the pawl 625 is then disengaged from the notch 633 and the wheel turned clockwise until the pawl engages in the notch 626. During this second movement of the wheel 623 the shafts 600 and 601 will be rotated clockwise (Fig. 26), thereby causing the square sided groove 617 in the shaft 601 to turn second type carriers on the shaft 601 to zero.

In addition to the consecutive numbering mechanism the cylinder 455 carries two sets of date type carriers for each ticket strip. These type carriers are loosely mounted on the shafts 600 and 601 and the carriers of the two sets are geared together in such a way that they may be simultaneously turned to position their type to print a new date. The type carriers for printing the months are all designated by the numeral 635 (Fig. 25). Attached to the side of each of the month type carriers is a gear 636. The three pairs of gears 636 mesh with gears 637 attached to a shaft 638. Fastened to the shaft 638 at near its right hand end is a gear 639 (Figs. 25 and 27) meshing with the gear 640 fastened to one end of a sleeve 641. To the other end of the sleeve is fastened a hand wheel 642 carrying a flange 643 bearing numerals 1 to 12, indicating the months. The type carriers for printing the tens of days numerals have fastened thereto gears 645 meshing with a gear 646 loose on the shaft 638. Meshing with one of the gears 645 for each pair is a gear 647 (Figs. 25 and 27), these gears 647 all being fastened to a shaft 648 journalled at its ends in the end plates of the cylinder. Attached to the shaft 648 is also a gear 649 meshing with a gear 650 fastened to one end of a sleeve 651. Secured to the other end of the sleeve is a knurled hand wheel 652. The units of these type carriers are similarly geared to a shaft 653, this shaft carrying a gear 654 meshing with a gear 655 secured to one end of a sleeve 666. Fastened to the other end of the sleeve 666 is a knurled hand wheel 667. From this description it is clear that by turning the wheels 642, 652 or 667 the date type carriers geared thereto will be turned simultaneously and that by this means the type carriers may be set to print any desired date.

All of the date type carriers are provided with toothed disks 670 which are engaged by spring pressed pawls 671 pivoted on the shafts 648 and 653. In order to hold these pawls in correct relation with the disks 670 there is provided a formed plate 672 extending the length of the cylinder, the side 673 of the plate engaging the inner periphery of the cylinder and its intermediate portion engaging the rock shaft 608. This plate is cut out to clear the arms 607 and has slots (not shown) through which the tails of the pawls 671 extend. The construction is such that the single plate 672 serves to hold the pawls 671 for all of the date printing type carriers in proper position.

The type carriers are prevented from being displaced laterally on the shafts 600 and 601 by plates 675. These plates are loose on the shafts 600, 601, and 638 and are held in proper positions on the shafts by spacing collars 676. For the sake of clearness none of the collars 676 are shown in Fig. 25, but are indicated in Fig. 26. The plate 675 at the right hand end of the cylinder has an upwardly extending portion 678 into which extends a long screw 679 supporting the various setting wheels and their sleeves and preventing any lateral movement of the wheels and sleeves.

Users of ticket issuing machines sometimes object to having consecutive numbers printed on the tickets, owing to the fact that from these numbers competitors may gain information as to the number of admissions and possibly use the information to the injury of the proprietor. For this reason means are provided whereby when desired the consecutive numbering mechanism may be disabled. As previously stated, the plate 612 (Fig. 15) containing the cam groove 611 may be rotated on its pivot 613 to a position where the cam groove will be concentric with the axis of the cylinder. When the cam groove is concentric the arm 609, will, of course, not be operated and the rock shaft 608 of the operating pawls 603 and 604 will be held stationary during rotations of the cylinder.

For the purpose of rocking the plate 612 the plate has an upwardly extending portion 682 carrying a stud 683 engaging a slot in the downwardly extending arm of a bell crank 684 pivoted on a stud 685 attached to the frame of the machine. The forwardly extending arm of the bell crank 684 is pivoted to the lower end of a link 686 extending upward toward the top of the machine. At its upper end the link has an opening 687 surrounding a stud 688 attached to the machine frame. Formed in the opening 687 are two notches 689 and 690. A spring 691 stretched between a fixed pin 692 and a pin 693 attached to the link draws the upper end of the link rearward to hold either the notch 689 or 690 in engagement with the stud, depending upon the position of the link. At its extreme upper end the link is provided with a knob 694 to permit easy operation of the link. The link is shown in the drawings in its upper position, that is, the position in which the plate 612 is held in eccentric position. When it is desired to disable the consecutive numbering mechanism the operator, will, by means of the knob 694, draw the upper end of the link forward to disengage the notch 690 from the stud 688 and then thrust the link downward and release it so that the spring 691 can engage the notch 689 with the stud 688. As the link is thrust downward it will rock the bell crank 684 clockwise (Fig. 15) about its pivot 685, thereby swinging the plate 612 to the position where its cam groove 611 will be concentric with the cylinder.

The cylinder 458 for printing on the faces of the tickets has attached to its periphery type plates 695, 696 and 697 (Fig. 23) for printing all the matter shown on the faces of the tickets (Figs. 18, 20 and 21) except the prices 698. The prices are printed from type carriers rotatably mounted in the interior of the cylinder, there being a pair of these type carriers for each of the ticket strips. The details of construction and the relative arrangement of the parts in the cylinder 458 may be seen in Figs. 17, 22, 23 and 29. The type carriers 699 and 700 for printing on the children's tickets are loosely mounted upon shafts 701 and 702 journalled at their ends in the end plates of the cylinder 458. Rigid with the type carriers 699 and 700 are gears 703 and 704 meshing with a gear 705 attached to a shaft 706. This shaft is journalled at one end in the right end plate of the cylinder and extends the full width of the machine. Attached to the left hand end of the shaft 706 is a gear 707 (see also Fig. 12). Adjacent the gear 707 is a companion gear 708 loosely mounted on the shaft. When it is desired to turn on the children's price type carriers 699 and 700 the gears 707 and 708 are coupled together by a broad tooth pinion 709 (Figs. 3 and 11) and the gears 707 and 708 then rotated, thereby causing the shaft 706 to be turned. This movement of the shaft will, through the gears 705, 703 and 704 cause the children's type carriers to be set. The mechanism for coupling the gears 707 and 708 together and then causing rotation of the shaft 706 will be explained in full a little later on.

The type carriers 712 and 713 for the adult tickets are mounted upon the shafts 701 and 702 respectively. Rigid with the type carrier 713 is a gear 714 fastened to the shaft 702, the teeth of the gear 714 meshing with the teeth of a gear 715 loosely mounted on the central shaft 706, the gear 715 also meshing with a gear 716 attached to the side of the type carrier 712. Attached to the left hand end of the shaft 702 is a gear 717 meshing with a gear 718 fastened to a sleeve 719 concentric to the shaft 706. This shaft extends toward the left of the machine to a point under the bank of keys 101 for the adult tickets. Attached to the left hand end of the sleeve 719 is a gear 720. Loosely mounted on the sleeve 719 and adjacent the gear 720 is a companion gear 721. The box type carriers 725 and 726 are also mounted on the shafts 701 and 702. Rigid with the type carrier 726 is a gear 727 fastened to the shaft 701 and meshing with a gear 728 loosely mounted on central shaft 706. The teeth of the gear 728 mesh with the teeth of a gear 729 rigid with the type carrier 725. Attached to the left hand end of the shaft 701 is a gear 731 meshing with a gear 732 attached to a sleeve 733 extending to the left as far as the bank of box keys 102. Fastened to the left end of the sleeve 733 is a gear 734 beside which is a loose companion gear 735. The companion gears 720 and 721 for the adult tickets and the companion gears 734 and 735 for the box tickets are like the gears 707 and 708 for the children's tickets, coupled together by broad tooth pinions 709 when a change is made in the prices of the tickets and it is desired to set the type carriers to the new positions.

Means are provided for locking all of the type carriers against rotation relative to the cylinder after they have been set. For this purpose the gears 705, 715 and 728 have rigid therewith notched locking disks 737 (Figs. 17, 22 and 23). Cooperating with these disks are arms 738 rigidly fastened to a rock shaft 739 journalled in the ends of the cylinder 458. Spring pressed aliners 7381 loosely supported on said shaft cooperate with alining disks rigid with said type carriers. The left hand end of the shaft 739 is attached to a two-armed lever 740 (Figs. 22 and 24), each of the arms of the lever carrying a roller 741 projecting into a circular opening 742 in a plate 743 pivoted on a stud 744 attached to the machine frame 91. Projecting into an inclined slot 745 in the plate 743 is a stud 746 carried by an arm 747 fastened to a rock shaft 748. In the normal position of the parts the rock shaft 748 and arm 747 are held in the position shown in Fig. 24, in which position the plate 743 is held with the opening 742 concentric with the cylinder 458. When the opening is concentric with the cylinder the rock shaft 739 in the cylinder is held with the arms 738 thereon positively engaged with the locking disks 737, and this, owing to the connection of the locking disks with the gearing connecting the type carriers prevents the type carriers from being displaced. When it is desired to change the setting of the type carriers the rock shaft 748 is rocked slightly in a clockwise direction (Fig. 24). This causes the stud 746 on the arm 747 to act against the inclined slot 745 in such a way as to rotate the plate 743 clockwise (Fig. 24) on its pivot 744. This movement of the plate is sufficient to bring the opening 742 in the plate 743 to an eccentric position with reference to the center of the cylinder. The edge of the opening 742 cooperates with the rollers 741 in such a way that as the plate 743 is moved to the eccentric position just mentioned, the shaft 739 will be rocked clockwise (Figs. 23 and 24) thereby withdrawing the locking arms 738 from engagement from the locking disks 737. After the type carriers have been set to their new positions the shaft 748 is rocked back to its original position, thereby restoring the plate 743 and returning the rocking arms 738 to their effective position. The mechanism for rocking the rock shaft 748 is a part of the price changing mechanism to be described later on.

Figure 14:
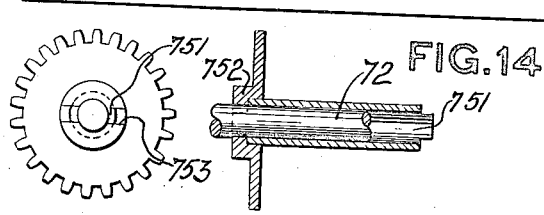
Fig. 14 is a group of details showing the manner in which some of the gears and tubes shown in Fig. 13 are constructed and assembled.

In Figs. 13 and 14 is shown a novel method of attaching gears to sleeves, the purpose of the construction being to permit assembling the gears on the sleeves without soldering or pinning, but at the same time, giving an accurate and durable connection between the gears and sleeves. The gears 310, 311, 316 and 315 are attached to their sleeves in this manner. The ends of the sleeves are provided with tongues 751. The gears have holes which are of the same diameter as the circumference of the respective sleeves, but these holes only extend a part of the way through the hubs of the gears. For the rest of the distance the holes are smaller in diameter. The hubs of the gears have cuts 753 taken all of the way across their ends, the bases of these cuts coinciding with the ends of the circular openings receiving the main portions of the sleeves. In assembling a gear on its sleeve the sleeve is inserted in such a way that the tongues 751 extend into the cuts 753. It is clear that the tongues 751 will cooperate with the cuts 753 in such a way that relative movement between the gears and the sleeves is prevented.

*Price changing mechanism.*

The price changing mechanism now to be described is the mechanism for simultaneously turning the price printing type carriers from one position to another. This mechanism comprises a lever 754 (Figs. 1, 3 and 8) for rendering the price changing mechanism effective or ineffective and three knurled disks 755, 756 and 757 connected respectively to the setting mechanisms for the children's, adult and box ticket strips. The lever 754 is fastened to a shaft 758 supported by the frames 62 and 63 and is connected by a link 759 to an arm 760 fast on a rock shaft 761. Attached to the rock shaft 761 is an arm 762 (Fig. 4) in which is formed a cam slot 763 engaging a stud 764 projecting from the forwardly extending arm of a bell crank 765. This bell crank is pivoted on the rod 402 and its vertical arm is connected by a link 766 to an arm 767 attached to the rock shaft 748 before mentioned. The lower end of the lever 754 is provided with a knob 768 whereby the lever may be operated. By tracing this mechanism through it will be seen that when the operator grasps the knob 768 and draws the lower end of the lever 754 forward the shaft 761 will be rocked, causing the cam slot 763 to rock the bell crank 765 counter clockwise (Figs. 3 and 4) and thereby also causing a counter clockwise rocking movement of the shaft 748. Attached to the rock shaft 748 is the arm 747 (Figs. 12, 22 and 24) previously mentioned for unlocking the price printing type carriers and the counter clockwise movement of the shaft as just described will operate said arm to rock the plate 743 to eccentric position to release the type carriers for rotation.

Figure 12:
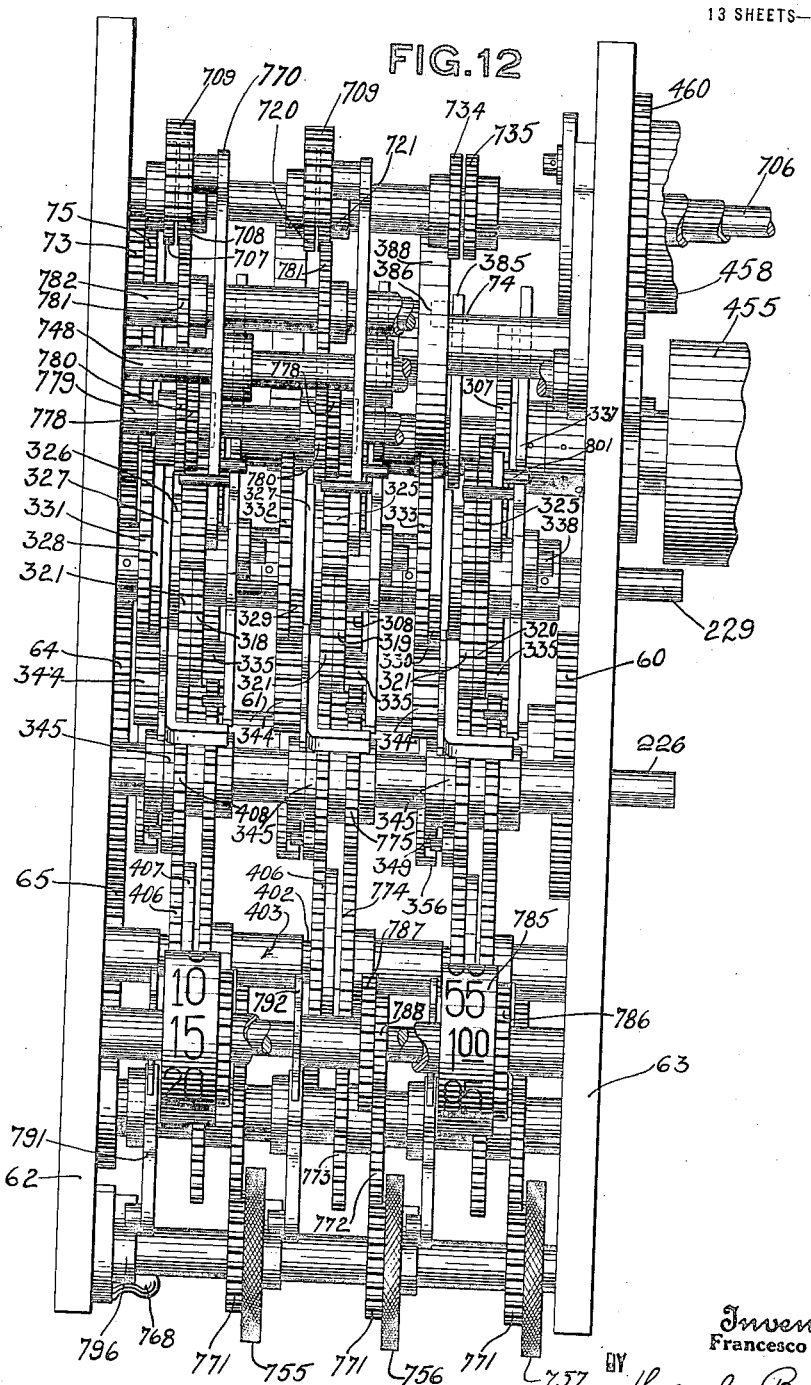
Fig. 12 is a top plan view of the manipulative devices and other mechanism immediately associated therewith for setting the type carriers for the tickets to be issued. In this figure one of the indicators and some of the other parts have been broken away for the sake of clearness.

The rock shaft 748 also has rigidly attached to it three levers 770 (Figs. 3, 11 and 12). The forwardly extending arms of these levers carry the broad tooth pinions 325 normally connecting the gears 318, 319 and 320 to their companion gears 321 for the respective actuators. The rearwardly extending arms of the lever carry the broad teeth pinions 709 for connecting the gears 707, 720 and 734 (Fig. 17) for the price printing type carriers to their companion gears 708, 721 and 735. When the shaft 748 is rocked the broad tooth pinions 709 are swung into engagement with the companion gears cooperating therewith while the broad tooth pinions 325 are withdrawn from engagement. This disconnects the gears 321 rigid with the actuators from their companion gears and couples together the companion gears for the price type carriers The gears 321 and the gears 708, 721 and 735 may now be rotated to position the type carriers and actuators by turning the disks 755, 756 and 757. The connections whereby this may be effected will now be described.

Attached to the sides of the knurled disks 755, 756 and 757 are gears 771 (Figs. 3, 11 and 12) meshing with gears 772 rotatable on the rod 761. Rigid with the gears 772 are gears 773 meshing with gears 774 loose on the rod 402 and meshing with gears 775 loose on the rod 226. These gears 775 are adjacent the gears 408, which, as previously stated, are also loose on the shaft 226. In the normal position of the parts, that is, when no keys are depressed the broad tooth pinions 335 (Figs. 11 and 12) are held in engagement with the teeth of the gears 775 and 408, the gears 408, it will be recalled being at all times in mesh with the gears 321, rigid with the actuators. It is apparent that when, for example, the box disk 756 is turned, movement of the disk will be transmitted through the gears 772, 773, 774 and 775, the broad tooth pinion 335 and the gear 408 to the gear 321 so that the gear last mentioned and the actuator 329 rigid therewith may be turned to any desired position. This movement of the gear 321 will, of course, also change the setting of the cam 326 and locking plate 327 rigid with the actuator.

As the gear 321 is turned, as just described, it will also turn the price printing type carrier. For this purpose meshing with the gear 321 is a pinion 778 loose on a rod 779. Rigid with the pinion 778 is a slightly larger pinion 780 meshing with a gear 781 loose on a rod 782 and meshing with the gear 721. Owing to the fact that at this time the broad tooth pinion 709 is in engagement with both the gear 721 and its companion gear 720, it is apparent that movement of the gear 321 will be transmitted through the gear 721, broad tooth pinion 709 and gear 720 to the box type carriers 712 and 713.

After the actuators and type carriers have been turned to the desired position the lever 754 is pulled back to its first position thereby rocking the shaft 748. This movement of the shaft locks all of the price printing type carriers in their new positions and also rocks the levers 770 to disengage the broad tooth pinions 709 from their companion gears and reengage the broad tooth pinions 335.

In Fig. 11 the actuator for the box tickets is shown in the position in which it will add to its full capacity, that is, $1.00. When the actuator is in this position the corresponding pair of type carriers is, of course, positioned to print the same amount. Any change from this setting of the actuator and type carrier must, of course, be to cause them to add and print lesser amounts.

In order to turn the actuator and type carrier from the position shown to the position where it will add and print lesser amounts the lever 754 is operated and the knurled disk 757 then turned counter clockwise. This will turn the gear 321 operating cam 326 and locking plate 327 also in a counter clockwise direction and this movement of the gear 321 will be imparted to the type carriers. The lever 754 is then restored to normal position. Then when the gear 321 is connected to driving mechanism and operated the actuator and operating cam 326 connected thereto will be turned in a counter clockwise direction (Fig. 11) and when the operating portion 354 of the cam 326 strikes the shoulder 352, the broad tooth pinion 344 will be rocked down so that as the teeth of the actuator come into engagement with the broad tooth pinion the movement of the actuator will be transmitted to the gear 333 fastened to the shaft 229. The extent of movement of the gear 321 is always the same so it is apparent that by setting the actuators and operating cams 326 at different positions the effective lengths of the actuators and the time of engagement of the broad tooth pinions may readily be varied, according to the amount to be added. Indicators 785 (Figs. 2, 3, 11 and 12) visible through the top of the casing are geared to the knurled disks 755, 756 and 757 in such a way that numerals on the peripheries of the indicators show the prices which the machine is prepared to print and add, these indicators also, of course, serving as guides in setting the actuators and type carriers. Attached to the side of each indicator is a gear 786 meshing with a gear 787 loosely mounted on the rod 146. Rigid with each gear 787 is a pinion 788 meshing with the gear 772 previously mentioned. This gearing is so proportioned that when one of the knurled disks is turned a corresponding extent of rotation will be imparted to the associated indicator.

In the normal positions of the parts the indicators are normally locked against rotation and this, because of the way in which they are geared to the rest of the price changing mechanism, prevents the mechanism from being disturbed. This locking mechanism comprises three bell cranks 791 (Fig. 3) loosely mounted on the rod 761. The upwardly extending arms of these bell cranks engage locking disks 792 rigid with the gears 787 and pinions 788. Springs 793 are constantly under tension and hold the bell cranks in engagement with the locking disks. The forwardly extending arms of the bell cranks 791 are provided with studs 795 (Fig. 3) normally engaging arms 796 fastened to the shaft 758. It is apparent that with the parts in the normal position shown the bell cranks 791 are held against movement, thereby preventing any movement of the price changing mechanism. When the lever 754 is drawn forward preparatory to changing the prices the shaft 758 will be rocked to carry the arms 796 from under the studs 795 thereby freeing the price changing mechanism for operation.

Means are also provided for preventing operation of the lever 754 when a key is depressed. This means comprises an arm 800 formed on the element 108 supporting the plate 105 for the children's key bank. It will be remembered that the arms supporting plates 105 for the other two banks are also attached to the shaft 109 so that operation of any key will cause a clockwise (Fig. 3) rocking movement of the shaft. This will carry the arm 800 down into the path of the arm 799 thereby making it impossible to draw the lever 754 forward to rock the shaft 748. On the other hand, if the lever 754 has been drawn forward the arm 799 will have been swung rearward under the arm 800 thereby preventing operation of any of the keys.

As an additional safeguard, means are also provided whereby, if a key is operated, rocking movement of the shaft 748 is prevented. This additional means comprises a stud 801 (Fig. 11) projecting from the forwardly extending arm of each of the levers 770. Cooperating with these studs are fingers 802 (see also Fig. 4) formed on the elements 337. These elements, it will be recalled, are rocked by operation of keys in their respective banks to connect the adding and printing mechanism for the bank to the driving mechanism. When a key is operated in a bank the upper end of the element 337 for that bank is moved forward, thereby carrying the finger 802 into engagement with the stud 801. This will hold the levers 770 and rock shaft 748 against movement in case an attempt is made to rock the shaft by operation of the lever 754.

*Operation.*

In order to operate the machine all that is necessary is to depress the key representing the number of tickets of the class desired. For example, if five box tickets are wanted the key bearing the numeral "5" in the row 102 (Fig. 1) will be depressed. This will release the operating mechanism and set the bell crank 140 (Fig. 4) in position for its tooth 139 to engage the fifth or lowermost tooth on the arm 138 and will also move the motor controlling arm 82 (Figs. 9 and 10) five steps away from the normal position in which it is shown. The machine will then operate five times until the arm 82 is returned to its first position to stop the motor and disconnect the electrical circuit.

When the key is depressed the corresponding element 337 (Figs. 4 and 11) is rocked about its supporting shaft 229 thereby engaging the broad toothed pinion 335 carried by the element with the pair of gears (Fig. 13) 308—309, 308—310, 308—211 loose on the shaft 72. One gear 308 of the pair is driven by a gear 307, fastened to the driving shaft 79, while the other gear drives the printing and adding mechanism for that particular section of the machine. The depressed key is latched in until the number of operations called for by the key have occurred and during each of these operations the ticket feeding and printing mechanism is caused to issue a ticket and the amount is added upon the cash totalizer 200.

Additions on the totalizer are effected by differential movement of the shaft 229, movement of this shaft being transmitted through suitable gearing, shown and described in the patent granted on the parent application, Serial No. 97584, to the unit element of the cash totalizer. The actuators 328, 329 and 330 for the children's, adult and box tickets respectively (Figs. 11 and 12) are loosely mounted upon the shaft 229 and are rigid with gears 321 also loose on the same shaft. The gears 321 are only driven when the corresponding pair of gears on the shaft 72 have been coupled together by their broad tooth pinions 335. When they are driven the gears 321 make a complete rotation and the actuators rigid with the gears are, of course, given the same extent of movement. The gears 321 get their movement because they are normally coupled to their companion gears 318, 319 and 320 by the broad tooth pinions 325, the companion gears being driven by the driving shaft 79 when the gears on the shaft 72 are coupled together by the broad tooth pinions 335.

Movement of the actuators is transmitted to the gears 331, 332 or 333 (Fig. 12) fastened to the shaft 229 through broad tooth pinions 344 carried by the plates 345 pivoted on the rod 226. Engagement of a broad tooth pinion with the corresponding gears 331, 332 or 333 attached to the shaft 229 is effected by the operating portion 354 of the cam 326 rigid with the actuator coming into engagement with a shoulder 352 on the plate 345 and rocking the plate to engage the broad tooth pinion 344 with the gear. Before the operating portion 354 passes out of engagement with the shoulder 352 a flange 356 on the disk 355 attached to the driving shaft 61 will engage the lug 348 on the plate 354 and retain the plate in rocked position until near the end of the operation when a cam 349 attached to the shaft 61 will rock the plate back to its first position. While the broad tooth pinion is in engagement with the gear 331, 332 or 333 on the shaft 229, the actuator, of course, makes a complete rotation and when its teeth engage the broad tooth pinion 344 the gear 331, 332 or 333 fastened to the shaft 229 is caused to rotate. This rotation of the shaft is transmitted through the intermediate gearing to to the units element of the totalizer.

The description of the printing mechanism went into detail to a considerable extent and it is believed to be unnecessary to repeat any part of the description here. All that is thought to be required at this point, is to state that when a broad tooth pinion 335 is engaged with the companion gears on the shaft 72 the corresponding section of the printing mechanism is coupled to the driving shaft and will print and issue tickets until the operated key is released and the broad tooth pinion 335 disengaged.

When it is desired to prepare the machine to print and add new prices because of a change in the prices of the tickets, all that is necessary is to draw the lever 754 (Figs. 1 and 3) forward and then turn the knurled disks 755, 756 and 757 until the indicators 785, visible through the top of the casing, show the new prices. The lever 754 is then returned to its original position.

When the lever 754 is drawn forward, as just mentioned, it rocks the shaft 748 and the levers 770 attached thereto. This movement of the shaft and levers unlocks the price printing type carriers, withdraws the broad tooth pinions 325 from engagement with the gears 321 and their companion gears 318, 319 or 320 and engages the broad tooth pinions 709 with the companion gears 707 and 708, 720 and 721, 734 and 735 for the price printing type carriers. Then when the knurled disks are turned the gears 321 are rotated to different positions with reference to their companion gears and the price printing type carriers are turned a like extent. When the lever 754 is returned to its first position the shaft 748 and levers 770 are rocked back to the position shown, thereby disengaging the broad tooth pinions 709 and reengaging the broad tooth pinions 325. This disconnects the companion gears for the printing type carriers and locks the carriers in their new positions and also, through engagement of the broad tooth pinion 325, holds the gears 321 and the actuators rigid therewith in their new relations with reference to their companion gears. Then when the machine is operated the new prices will be printed and added.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of a feeding device common to a plurality of ticket strips, and a plurality of members adapted to be selectively moved into cooperative relation to said device for selecting the strip to be fed by said device.

2. In a machine of the class described, the combination of a feeding cylinder common to a plurality of ticket strips, and independent means for each strip for selecting the strip to be fed by said cylinder.

3. In a machine of the class described, the combination of a feeding device common to a plurality of ticket strips normally out of feeding relation therewith, and means for selectively establishing feeding relation between any desired strip and said device whereby the selected strip is fed.

4. In a machine of the class described, the combination of a feeding device common to a plurality of ticket strips normally out of engagement therewith, and means for selectively moving any desired strip into engagement with said device whereby the selected strip is fed.

5. In a machine of the class described, the combination of a feeding cylinder common to a plurality of ticket strips, and means adapted to selectively engage the strips for selecting the strip to be fed.

6. In a machine of the class described, the combination of a feeding device common to a plurality of ticket strips normally out of feeding relation therewith, means for selectively establishing feeding relation between any desired strip and said device whereby the selected strip is fed, and a plurality of manipulative devices for controlling said means.

7. In a machine of the class described, the combination of a feeding device common to a plurality of ticket strips, a cooperating feeding member for each ticket strip and normally out of engagement with the common feeding device, a plurality of keys, and means controlled by the keys for moving any desired member into engagement with said feeding device to feed the corresponding ticket strip.

8. In a machine of the class described, the combination of a feeding device common to a plurality of ticket strips, a cooperating feeding member for each ticket strip and normally out of engagement with said feeding device, supports for the feeding members independently movable to move their members into engagement with the feeding device, and manipulatively controlled means for moving the supports.

9. In a machine of the class described, the combination of a feeding cylinder common to a plurality of ticket strips, cooperating rollers, one for each strip, normally out of engagement with the feeding cylinder, independently movable supports carrying said rollers, and manipulatively controlled means for selectively moving the supports to establish feeding relationship between any desired roller and the feeding cylinder.

10. In a machine of the class described, the combination of a feeding device common to a plurality of ticket strips, a cooperating feeding member for each ticket strip normally out of engagement with the feeding device, eccentrics supporting the feeding members and independently rotatable to engage their members with the feeding device, and manipulatively controlled means for selectively rotating the eccentrics.

11. In a machine of the class described, the combination of a feeding cylinder common to a plurality of ticket strips, feeding rollers, one for each strip, normally out of engagement with the feeding cylinder, independently movable supports carrying said rollers, a series of keys for each strip, and means controlled by each series of keys for moving the corresponding support to engage its roller with the feeding cylinder.

12. In a machine of the class described, the combination of two feeding cylinders common to a plurality of ticket strips, a pair of feeding rollers for each strip normally out of feeding relation with the corresponding feeding cylinders, and means for establishing feeding relation between the rollers of any desired pair and the feeding cylinders to feed the corresponding ticket strip.

13. In a machine of the class described, the combination of two feeding cylinders common to a plurality of ticket strips, a pair of feeding rollers for each ticket strip normally out of feeding relation with the corresponding feeding cylinders, manipulative devices, and means controlled by said manipulative devices for establishing feeding relation between the rollers of any desired pair and the feeding cylinders to feed the corresponding ticket strip.

14. In a machine of the class described, the combination of two feeding cylinders common to a plurality of ticket strips, a pair of feeding rollers for each ticket strip and normally out of feeding relation with the corresponding feeding cylinders, movable supports carrying the rollers, manipulative devices, and means controlled by said devices for operating the supports for any desired pair of rollers to move the pair into feeding relation with the common cylinders.

15. In a machine of the class described, the combination of a feeding device common to a plurality of ticket strips and variably operable according to the number of tickets to be fed, mechanism for variably operating said device, a feeding member for each strip normally out of cooperating relationship with the feeding device, means for moving any desired member into cooperating relationship with the feeding device whereby to feed any desired strip, and manipulative devices operable to control said means and the aforesaid operating mechanism.

16. In a machine of the class described, the combination of a feeding cylinder common to a plurality of ticket strips and variably rotatable to feed one or more tickets, mechanism for variably rotating the cylinder, feeding rollers, one for each strip, normally out of cooperating relationship with the feeding cylinder, means for moving any desired roller into cooperating relationship with the feeding cylinder, a plurality of keys, and connections whereby operation of a key controls both said means and the aforesaid mechanism.

17. In a machine of the class described, the combination of a feeding cylinder common to a plurality of ticket strips and variably rotatable to feed one or more tickets, mechanism for variably rotating the cylinder, feeding rollers, one for each strip, normally out of cooperating relationship with the cylinder, means for moving any desired roller into cooperating relationship with the feeding cylinder, and a keyboard controlling both said means and the aforesaid mechanism.

18. In a machine of the class described, the combination of a feeding cylinder common to a plurality of ticket strips and variably rotatable to feed one or more tickets, mechanism for variably rotating the cylinder, feeding rollers, one for each strip, normally out of engagement with the feeding cylinder, means for moving any desired roller into engagement with the feeding cylinder, a series of keys for each strip, and connections whereby the series controls both said means and the aforesaid mechanism.

19. In a machine of the class described, the combination of a feeding device common to a plurality of ticket strips and actuated one or more times at an operation according to the number of tickets to be issued, mechanism for actuating the feeding device, a feeding member for each strip normally out of cooperating relationship with the feeding device, means for selectively establishing cooperative relationship between the feeding device and the feeding members whereby to feed tickets from any desired strip, and manipulative devices operable to control said means and the aforesaid mechanism.

20. In a machine of the class described, the combination of a feeding device common to a plurality of ticket strips and actuated one or more times at an operation depending upon the number of tickets to be issued, mechanism for actuating the feeding device, a feeding member for each strip normally out of cooperating relationship with the common feeding device, means operable to move any desired member into cooperating relationship with the feeding device whereby to feed tickets from any desired strip, a keyboard, and connections whereby operating a key controls said means and the aforesaid mechanism.

In testimony whereof I affix my signature.

FRANCESCO SKERL.